(12) United States Patent
Cobián Babé et al.

(10) Patent No.: US 12,030,600 B2
(45) Date of Patent: Jul. 9, 2024

(54) STRUCTURE FOR SUPPORTING MARINE INSTALLATIONS AND PROCEDURE FOR THE EXECUTION THEREOF

(71) Applicant: BERIDI MARITIME S.L., Madrid (ES)

(72) Inventors: Ignacio Cobián Babé, Madrid (ES); Clara Acosta Gutiérrez, Madrid (ES); José María Berenguer Pérez, Madrid (ES)

(73) Assignee: BERIDI MARITIME S.L., Madrid (ES)

(*) Notice: Subject to any disclaimer, the term of this patent is extended or adjusted under 35 U.S.C. 154(b) by 163 days.

(21) Appl. No.: 17/755,863

(22) PCT Filed: Nov. 12, 2019

(86) PCT No.: PCT/ES2019/070776
§ 371 (c)(1),
(2) Date: May 10, 2022

(87) PCT Pub. No.: WO2021/094630
PCT Pub. Date: May 20, 2021

(65) Prior Publication Data
US 2022/0380006 A1    Dec. 1, 2022

(51) Int. Cl.
*B63B 75/00* (2020.01)
*B63B 77/10* (2020.01)
(Continued)

(52) U.S. Cl.
CPC .............. *B63B 75/00* (2020.01); *B63B 77/10* (2020.01); *F03D 13/256* (2023.08); *B63B 2035/446* (2013.01)

(58) Field of Classification Search
CPC ... B63B 2035/446; B63B 75/00; B63B 77/00; B63B 77/10; F03D 13/25; F03D 13/256; F03D 13/126
See application file for complete search history.

(56) References Cited

U.S. PATENT DOCUMENTS 4,701,075 A    10/1987 Martyshenko et al.
9,120,542 B2 *  9/2015 Choisnet ................. F03D 13/25
(Continued)

FOREIGN PATENT DOCUMENTS

AU    2019465288 A1 *  6/2022 ............. B63B 1/041
CN    102530191 A   *  7/2012 ............. B63B 9/065
(Continued)

OTHER PUBLICATIONS

International Search Report issued in corresponding International Application No. PCT/ES2019/070776 dated Oct. 7, 2020.

*Primary Examiner* — Frederick L Lagman
(74) *Attorney, Agent, or Firm* — NORTON ROSE FULBRIGHT US LLP

(57) ABSTRACT

The invention relates to a structure (2) for supporting a wind turbine tower (1) provided with a housing (7) for fitting therein the foot of the tower (1), a main axis (Γ) being defined on the platform (2) which coincides with a main axis of the tower (1), and which comprises a body with a constant cross-section and internal walls (8) and intermediate walls (10) joined by internal radial ribs (11) perpendicular to the internal wall (8) whose plane passes through the main axis (Γ), such that at the intermediate wall (10) first joining nodes (12) are defined between the intermediate wall (10) and radial ribs (11), the intermediate wall (10) and an external wall (9) being joined by reticular ribs (14 and 15). This structure provides an optimal transmission of forces. The (Continued)

invention likewise relates to methods for manufacturing, assembling and installing the structure.

20 Claims, 18 Drawing Sheets

(51) Int. Cl.
  *F03D 13/25* (2016.01)
  *B63B 35/44* (2006.01)

(56) References Cited

U.S. PATENT DOCUMENTS

| | | | |
|---|---|---|---|
| 2013/0233231 A1* | 9/2013 | Dagher | B63B 75/00 114/265 |
| 2021/0276673 A1* | 9/2021 | Boo | F03D 13/25 |
| 2023/0002018 A1* | 1/2023 | Martínez De Azcoitia Fernández | B63B 35/44 |

FOREIGN PATENT DOCUMENTS

| | | | | |
|---|---|---|---|---|
| CN | 113279918 A | * | 8/2021 | ............ B63B 35/44 |
| CN | 113530761 A | * | 10/2021 | |
| CN | 114084302 A | * | 2/2022 | |
| ES | 2456345 T | | 4/2014 | |
| ES | 2617991 A1 | * | 6/2017 | ............ E02B 17/02 |
| ES | 2638011 A1 | * | 10/2017 | ......... E02B 17/0004 |
| KR | 20120038062 A | * | 4/2012 | |
| KR | 20200060766 A | * | 6/2020 | |
| WO | 1288122 | | 3/2003 | |
| WO | WO-2009131826 A2 | * | 10/2009 | ............ B63B 1/107 |
| WO | WO-2014031009 A1 | * | 2/2014 | ............ B63B 1/107 |
| WO | WO 201406050 | | 4/2014 | |
| WO | WO-2014177729 A1 | * | 11/2014 | ............ B63B 21/50 |
| WO | WO-2016016481 A1 | * | 2/2016 | ........... E02B 17/025 |
| WO | WO 2016156624 | | 10/2016 | |
| WO | WO-2018150063 A1 | * | 8/2018 | ............ E02B 17/02 |

* cited by examiner

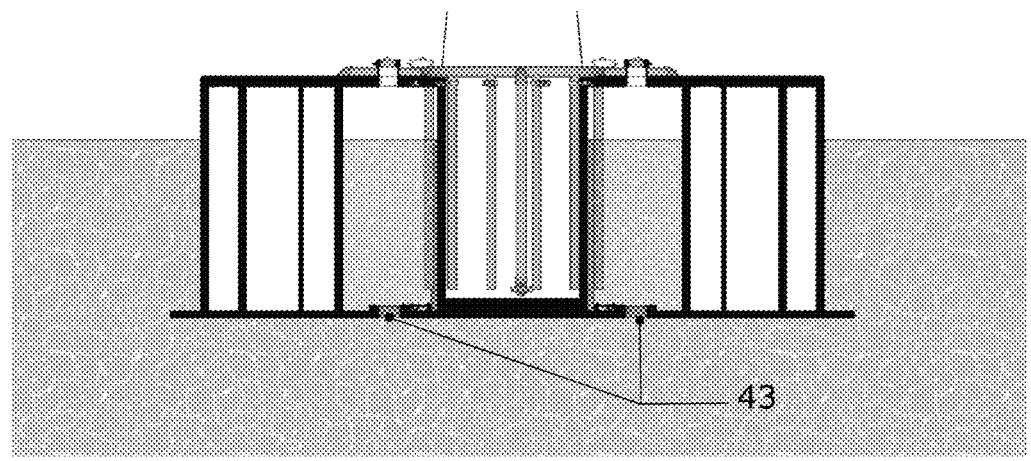
FIG. 25
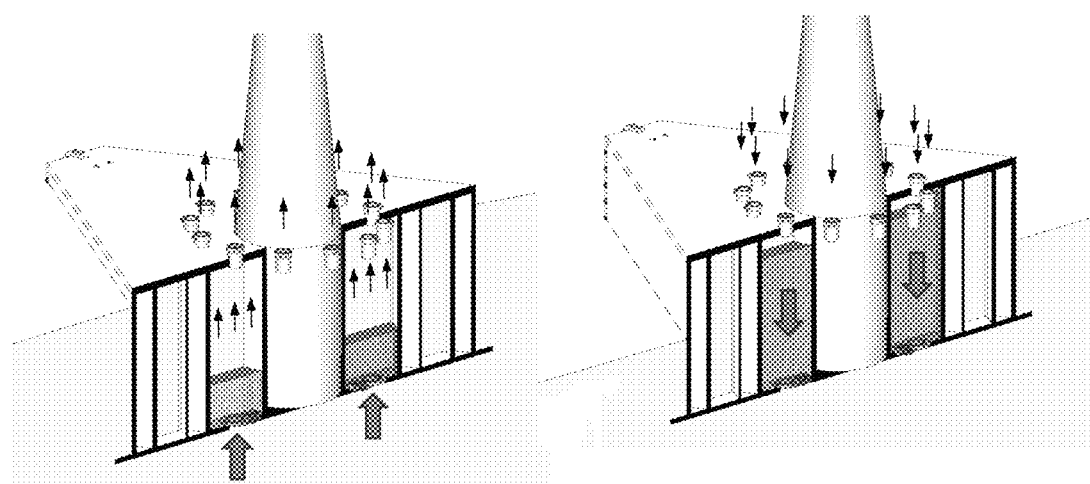
FIG. 26a  FIG. 26b

STRUCTURE FOR SUPPORTING MARINE INSTALLATIONS AND PROCEDURE FOR THE EXECUTION THEREOF

CROSS REFERENCE TO RELATED APPLICATIONS

The present application is a national phase application under 35 U.S.C. § 371 of International Application No. PCT/ES2019/070776 filed Nov. 12, 2019. The contents of the referenced application are incorporated into the present application by reference.

OBJECT OF THE INVENTION

The present invention belongs to the field of marine structures, to the construction and implementation of buildings and installations in the marine environment. More specifically, it relates to a floating structure and to the method thereof for constructing, assembling, commissioning and dismantling a maritime structure.

In this document, reference will be made to methods on a maritime concrete structure of the aforementioned type without implying a limitation on the scope of the invention in terms of dimensions of the base, dimensions of the towers (or absence thereof) and shape (triangular, rectangular, hexagonal, polygonal, circular or lobed). Moreover, it is applicable to semi-submersible, spar and TLP floating platforms, and it would even be applicable to platforms that, despite moving by floating, have their final location on the seabed.

The object of the invention is a high-performance floating platform and the description of an innovative and effective construction, assembly and commissioning system that entails considerable cost savings, a much shorter implementation time compared to existing platforms, and maximum safety.

Regarding the terminology used in this document, it is important to highlight the equivalence of the terms: platform, structure and base; as well as the terms: wall, facing, enclosure and rib.

BACKGROUND OF THE INVENTION

In recent years, maritime structures implanted in the marine environment have experienced significant growth, especially due to the great boom in offshore wind energy that is beginning to spread throughout the world from northern Europe.

The culmination of this growth process will occur when the cost of offshore wind energy is lower than that generated by other means, and this goal is within reach.

Essentially all large wind turbine manufacturers are developing high-power models (10, 12, even 15 MW) that entail a notable increase in the dimensions thereof and in the actions they perform on the maritime structure supporting them.

This increase in power, however, is precisely the key point for the decrease in energy costs since it makes the impact of the cost of the base and installation to be much lower per installed MW.

Therefore, at present there exists the important technological challenge of developing said platforms while following industrialized processes that allow for the intensive construction thereof in very different locations, with preferably local means and in the time needed to reduce the cost of the logistics involved with their commissioning.

This means overcoming various problems that have arisen with the large increase in new wind turbines to be supported, such as:

1. A replicable construction system is required which enables large platforms to be constructed which occupy an area of the order of 50 m in diameter and which must be finally floated by means of some auxiliary means. Currently, there are essentially no already built means that allow this task to be carried out, since all these installations have been prepared for the manufacture of ships with a length that is clearly greater than their beam, which almost never exceeds 40 m. Moreover, they are scarce and expensive means which would create a major bottleneck when mass production is needed for a wind farm.

2. Faced with the new great stresses, the constructed structure is required to have high structural strength, fatigue strength, and impact resistance, with low maintenance and great durability. Therefore, the construction system must provide the structure with a high degree of compactness and monolithism that can hardly be ensured with prefabricated systems whose joints are potential sources of possible failures.

3. The maritime structure must provide a sufficient and effective response to the new major actions that it will be subjected to, but which in turn can be easily dismantled.

The structure must produce a large restoring moment that minimises the static angle of inclination in the service phase, but with low accelerations in the turbine. This also requires an inherently heavy structure that does not require additional solid ballast and thus allows it to be transferred back to port when necessary.

The most suitable way to achieve this great weight at a low cost is by using reinforced concrete following the port caisson construction technique that has been extensively developed and used in Spain with excellent cost and efficiency results. The great difficulty is that due to its size it cannot be carried out at any of the existing floating docks.

4. The maritime structure must be constructed and assembled entirely in port, and be transported by tugboats to the service position thereof. This represents a significant reduction in cost as it does not require the costly and scarce auxiliary means that would be required for the offshore installation of large new wind turbines. The construction method must be able to be carried out with low draught so that it can be carried out in the vast majority of existing ports and thus be able to distribute production and bring it closer to the installation site.

The design and manufacture of floating structures for supporting wind turbines is currently based on technology developed by the oil and gas industry. In this way, as explained above, three primary types of platforms can be distinguished: Semi-submersible, Spar and TLP. These three types correspond to three systems for stabilising the structure against external actions (wind, waves and currents):

Buoyancy stabilisation
Ballast stabilisation to lower the centre of gravity
Stabilisation by mooring lines Most of the platforms with floating concrete bodies are basically circular prisms with radial internal walls from a core that coincides with the shaft of the wind turbine. Due to the large size thereof, they are usually constructed from prefabricated elements, mainly in dry dock. In addition to the considerable extra cost involved in constructing the installations, they have two important disadvantages that the proposed solution does not have:

The joints between prefabricated pieces are not monolithic and are therefore susceptible to failure in exceptional conditions.

In the event of a water leak, a very important percentage of the base would be flooded, possibly putting it at risk.

Due to the construction system thereof, the proposed structure is completely monolithic, and in the event of a very serious accident, only a small cell of the perimeter would be flooded thanks to the double hull that makes up the external cells (18) (FIGS. 2a and 2b).

U.S. Pat. No. 9,120,542 describes an annular floating body with the wind turbine arranged eccentrically on one of the sides thereof. The solution is technically very valid, but it has great structural difficulties when carried out.

The annular shape causes the wind turbine, which is located on one of the sides thereof, to significantly bend the structure on the lateral arms, which, if made of concrete, would crack on the upper face thereof, deteriorating and reducing its useful life. To avoid this, in addition to the need for a significant amount of steel (up to 400 kg/m3), post-tensioned cables must be arranged to compress the structure in the upper portion thereof.

On the other hand, the tower is connected to the upper face of the concrete structure by means of bolts that require important anchors to locally transmit the entire bending moment produced by the wind.

All this translates into a high-cost concrete structure, with a great deal of reinforcement, a long construction time and fatigue problems due to stress concentration.

On the contrary, as already seen, the proposed solution has almost no bending forces and distributes the loads without any type of stress concentration. FIGS. 2a and 2b show how the invention, with the distribution of facings, homogeneously transfers the forces of the tower, first through the radial facings, and then always through three smaller facings that reach the perimeter.

The internal pool of the ring has the problem that it hardly traps the mass of water that it contains therein, nor the mass of water below it. On the other hand, the great advantage of the proposed invention is that it traps both, thus notably extending all the oscillation periods and reducing accelerations.

Patent WO2009131826 describes a metal floating body made up of three towers, with heave brackets, joined by connection arms through which the transfer of active ballast circulates in order to stabilise it. This is certainly the most tested solution today with good results. However, the proposed solution has great improvements:

The cost of the steel required for the construction thereof is more than double the cost of the finished concrete in the proposal.

The fatigue of the components, especially in towers and connecting arms, is very high compared to the lack thereof in the compact concrete piece of the proposal.

Energy production must be reduced while the ballast is being transferred, and in the proposal it is always the maximum that can be obtained.

The trapped water is carried out under the heave brackets, while in the proposal it is on the entire surface of the base and in the central cells.

The structure requires maintenance of submerged metal elements and equipment, while in the present invention, this is not required since everything is above ground on the deck.

Patents WO2014031009 and WO2014177729 are configured, at least in some of the configurations thereof, from hollow concrete bodies joined together by means of arms that are also hollow and through which water passes from one to another. Given the low initial draught thereof, these solutions, like the previous patents, can be towed with the fully installed wind turbine and have a simple installation system since they are only ballasted with water. Since the stabilising torque is lower (more than half of that of the proposal) than the tipping torque at maximum production, an active system for transferring ballast from some bodies to others with the usual loss of electricity production must be used.

The greatest problem in both solutions, however, involves construction when it is carried out in concrete. Both one and the other require implementing different hollow bodies that are impossible to implement at once. Solutions have been proposed for implementation by pieces (towers and pontoons) which are joined with post-tensioned complexes, producing a series of joints precisely where the greatest amount of stress is concentrated. This results in structures that require a lot of maintenance and undergo a lot of fatigue.

The proposed solution solves this problem in concrete, constructing a compact piece, without protruding elements and with unparalleled strength and durability.

DESCRIPTION OF THE INVENTION

The proposed structure belongs to the "semi-submersible" type, with buoyancy stabilisation; however, its use as a spar is also possible. This last option would require solid ballast for the installation thereof, such that, being perfectly viable, its uninstallation would be more complex and not as immediate as the semi-submersible structure that is ballasted only with water. Use as a TLP is also possible, but not as a preferred configuration.

For this, the invention is made up of a concrete structure, the construction of which is based on the technology of port caissons for the construction of docks and piers, which is widely used in Spain. These structures are gravity-based structures, manufactured on a floating dock (normally called "caisson plant"), which are transported by flotation to the service location thereof. They are large reinforced concrete structures, normally parallelepiped, the inside of which is made up of a series of vertical facings that form cells so as to reduce the weight of the same and provide the assembly with buoyancy. The construction thereof is very versatile, by means of the sliding formwork technique, which allows for continuous and very efficient production, and direct flotation as it is being constructed.

The proposed structure has been designed so that when it is constructed in caisson plant, maximum performance and minimum cost are obtained (although it is also possible to construct it in dry dock or on a fixed platform on a pier without such advantageous properties).

It has the following features:
1. Optimal Structural System
a. Great Robustness and Resistance to Possible Contingencies One of the advantages of applying the method of the sliding formwork arranged in the caisson plant is the monolithism achieved in the construction. The advantage of being able to place it in the formwork in small layers is used, in addition to being able to compact it and ensure the joining thereof with the previous layer under perfect conditions, removing the concrete joints.

Moreover, this type of construction allows for very rigid structures with many facings that distribute the loads to be made.

With all this, a structure of great resistance to atmospheric conditions and impacts is achieved which, although in the very exceptional case of a water leak, would only flood a small cell with hardly any repercussion on the stability of the assembly.

On the contrary, in the concrete floating platform solutions that are currently being designed on the market, to achieve performance that is somewhat similar to that of the caisson plant, prefabricated elements are used, the joints of which are susceptible to failure, and the water that could be introduced in such a case would seriously compromise the integrity of the structure.

b. Stress Minimisation

The proposed floating structure, based on the vast knowledge of how port caissons work, is designed to make the most of its properties.

Despite the great forces to which it will be subjected and the significant moment transmitted by the wind turbine that it has to compensate for, the concrete of the entire structure hardly undergoes bending. The main stress on the structure is compression. This is achieved by the very geometry and configuration thereof:

The wind tower is not joined to the platform via a plate with bolts that concentrates all the torsion in that area, but rather it transforms it into compressions at the upper and lower portion of the platform via a simple joint, so that the stresses are not concentrated at one point, but are distributed throughout the embedment in a way similar to a piling in competent ground.

To do this, the wind turbine tower is simply inserted into the central hole left free by the structure, the full height thereof entering until it rests on the lower plate, and the gap between them is filled with grout. In this way, it works like a piling in optimal terrain, such that it needs very little driving depth, with the available height of the caisson being more than enough to guarantee stability.

The wall of the central concrete cylinder is not what will absorb the compression transmitted by the tower, but rather it will be distributed by the large radial walls that stiffen it and the very thick upper and lower plates.

The great weight provided by all the concrete used in the platform and the water ballast that is added (around 36,000 t), together with a metacentric height between 7 and 10 m, achieves great restoring torque that makes it possible to face the greatest actions of the environment. Other solutions that are not so heavy must raise the metacentric height up to 15 m to achieve much smaller restoring torques.

The fact that the metacentric height is not excessively large (less than 10 m) is important because in addition to reducing the accelerations produced in the turbine, it makes the separation of the forces of the weight of the structure and the thrust of the water very small (around 0.8 m for 5° inclination) and therefore it hardly produces any bending force in the structure.

On the other hand, other solutions on the market, due to the great metacentric height thereof, have these forces much further apart and therefore they produce significant bending stresses that must be compensated with post-tensioned cables or with the use of a greater amount of steel. The present invention is clearly the semi-submersible platform with lower bending stresses.

The arrangement of the wind turbine in the centre of the platform (unlike the previously mentioned ones that have the tower off-centre) greatly reduces the bending force that the base thereof undergoes.

The force exerted by the mooring lines on the structure is directly absorbed and distributed by three large main radial screens (FIG. 28), without concentrating the stresses locally. Although in the indicated figure, the mooring points are located on the upper portion of the facings, according to the application configuration, they may also be located at intermediate heights, even at the level of the lower plate, with identical derived properties.

The external spans of the structure are only of the order of four metres, with wall thicknesses of 50 cm, such that the bending that can occur on the same is very small.

All this results in a structure with many walls that distribute loads very well, which requires very little assembly and does not have stress concentration points where fatigue would act.

c. Great Durability and Low Maintenance

One of the greatest dangers of concrete structures in the marine environment is cracking, which can increase the risk of reinforcement corrosion.

When also subjected to the cyclical loads of the waves and wind, fatigue can occur which increases the problem in the elements where, due to the slenderness thereof, they are more exposed, such as cantilevers, projections and towers.

In the present invention, cracking is very low because the concrete is mostly compressed. Therefore, maintenance is almost zero due to low stresses and concentrations in a concrete that is hardly reinforced.

In addition, the structure in the service position thereof is only ballasted with water. This enables easy emptying for transfer back to port and for onshore maintenance. Moreover, a "plug and play" system has been provided for the moorings and electrical connection, such that this process can be carried out with great ease.

d. Great Implementation Speed

The manufacture of caisson plant structures is a highly tested technology with well-proven logistics. It is possible to manufacture 20,000 t pieces in just 7 days.

The caisson plant dock is transported to the location where it is needed and can be installed in a location where it does not interfere with the port's daily activity. It is therefore very versatile and can be used in almost all types of ports.

All this implies a high-quality implementation in record time, especially in large structures.

2. Large Volume of Water Trapped in the Movements

Those skilled in the art know that to minimise turbine accelerations, the floating structures have to trap most of the surrounding water as they move in order to increase the inertia in the heave and in the pitch/roll of the assembly. This increase in inertia increases the oscillation periods thereof, such that the accelerations at the head of the mast decrease.

Many existing platforms already include a heave plate, which consists of a cantilever that borders the structure and increases the water trapped in the movements thereof. It is a fairly effective solution, but it is limited to the width of a cantilever that undergoes significant cyclical actions that cause significant fatigue to the structure thereof.

The present invention has been designed to trap as much water as possible, consisting of a large lower plate with perforations in the central area (52) thereof (FIG. 7), such that it traps water both in the lower and upper face thereof, since the speed of the flow passing through the gaps is much slower than the movement of the assembly.

This lower plate, on the one hand, moves outwards about two metres around the base (53) (FIG. 7), which constitutes a very resistant heave plate, similar to other solutions. But the most important aspect is the immense volume of water trapped by the assembly of the lower plate equivalent to a hemisphere of the radius of the circle inscribed on it, as well as the water that is inside the central cells connected to the outside. This entire volume entails an added mass of the structure of 1 to 2 times the displacement thereof (depending on the shape of its perimeter), i.e., as if the mass of the platform were double or triple its original mass.

On the other hand, the existing solutions that use heave plates, which are usually made up of three towers, only manage to increase their mass by 0.5 to 0.8 times the displacement thereof, since they do not have a large lower plate that joins them nor internal cells connected to the outside via gaps.

3. Low Draught

The proposed platform, together with the superstructure supporting it (wind turbine), has an initial draught (around 10 m), which notably increases the availability of piers close to the location of implementation for the construction thereof.

This allows a complete onshore installation to be performed and towed to its location in a vertical position, having great naval stability, a high natural period with which it rocks back and forth and low resistance to displacement.

The process of commissioning the structure is simply carried out by ballasting the cells thereof with seawater, without the need for any additional means or special auxiliary vessels with large capacities or flotation elements outside the structure itself.

The uncoupling process for greater maintenance in port is totally viable, since, given that it has been only ballasted with water for the commissioning thereof, reversing the process carried out by the filling pumps, recovering the 10 m draught, is sufficient.

4. Large Restoring Moment

Due to the platform's large mass with a displacement of around 30,000 t and a high metacentric height of about 9 m (it varies slightly according to the different alternatives), it offers a large restoring moment of 25,000 t m which entails a static angle of inclination of 5° for a 10 MW wind turbine without needing to use variable ballast to improve it. This restoring moment is key for energy production, and in the present invention it is two to three times higher than the rest of floating solutions that usually have 7,000 to 14,000 t m.

It should be noted that the displacement of the proposed structure is at least three times greater than the rest of the existing platforms (they are usually between 8,000 and 10,000 t). This significant increase in weight is achieved specifically thanks to its manufacture using reinforced concrete caissons, which manage to produce high-mass structures at low cost. Achieving a similar displacement in steel is unfeasible due to the cost thereof, and the other existing solutions made in concrete have significant construction and durability problems due to cracking.

5. Increased Energy Production

The turbine's energy production is guaranteed at full capacity at all times, since at 11 m/s of wind, which is when the greatest tipping torque is exerted in a 10 MW turbine, the platform is inclined less than five degrees.

The other solutions with a restoring torque that is two or three times smaller have to reduce energy production to reduce the force of the wind until water is transferred from some towers to others, and thus compensate for the over-inclination that would occur. This process would take about half an hour every time there is a significant change in wind, such that production would be affected. In a failure or during maintenance of the system, it would have to be completely interrupted.

The proposed solution can also make use of this variable ballast system, not only to avoid excessive inclination but also to quickly reduce it to a minimum. This makes it possible to take full advantage of the energy of the wind that blows at less than 11 m/s and therefore significantly increases the MWh produced. In this way, as seen in FIG. 29, for every 170 m³ of transferred water, they expand 7,000 t m, enough to optimise production. This entails an increase in the height of the water column of about two metres for the cells arranged at one vertex (44) (FIG. 29) and a decrease of one metre for those at the other two vertices. This process would take about 10 minutes using two 500 m³/h pumps.

The transfer of water between the end cells is carried out by means of pipes (41) (FIG. 23) activated by pumps, which remain on the deck for inspection and maintenance.

6. Accessible Maintenance of all Equipment

As in the case of the water transfer described above, all the installations of the platform that can be maintained (connection of the mooring system, electrical systems, sensors, pipes, pumps, control systems, etc.) are at deck level, always above sea level.

There are no metal structures that remain submerged and therefore require maintenance, and moreover, there is plenty of space on deck to support any type of machinery that facilitates the maintenance of the wind turbine tower or superstructure that will always be above ground.

7. Low Cost

The caisson plant concreting is the most modern, efficient and environmentally friendly technology that exists for the construction of wind and port infrastructures. This alone entails an environmental improvement, but it also means savings in possible corrective measures.

Fewer raw material resources are consumed which, depending on the features of each body, can lead to savings of 50%.

The implementation speed not only implies time and money savings, but it also represents a very notable reduction of polluting substances with respect to traditional techniques.

The low reinforcement of the proposed structure and the rapid implementation thereof represent a cost reduction of more than 50% compared to another similar metal structure.

The proposed construction system, which consists of two methods, leads to great savings both in the creation of few units and in large productions.

The properties described above overcome the drawbacks presented by the aforementioned platforms of the state of the art.

The present invention consists of two parts: the definition of the structure and the construction, assembly and commissioning process, aspects that are discussed in the section on preferred embodiments of the invention.

BRIEF DESCRIPTION OF THE DRAWINGS

1. Superstructure (usually wind tower)
2. Base
3. Structure that makes up the base (caisson)
4. Lower plate of the caisson 5. Facings of the caisson
6. Upper plate
7. Housing for fitting therein the foot of the tower

8. Internal wall
9. External wall
10. Intermediate wall
11. Radial ribs
12. First joining nodes
13. Reticular structure
14. First reticular ribs
15. Second reticular ribs
16. Second joining nodes
17. Internal cells
18. External cells

19. Joining walls between caissons
20. Reticular structure of each caisson

8bis. Central wall section
   9bis. External wall section
   10bis. Intermediate wall section FIG. 3a shows a plan view of the invention made up of a single hexagonal caisson where the proposed structural system and the distribution of the loads transmitted by the wind turbine are shown. It is made up of the same elements as FIG. 2a.

Figure 2B:
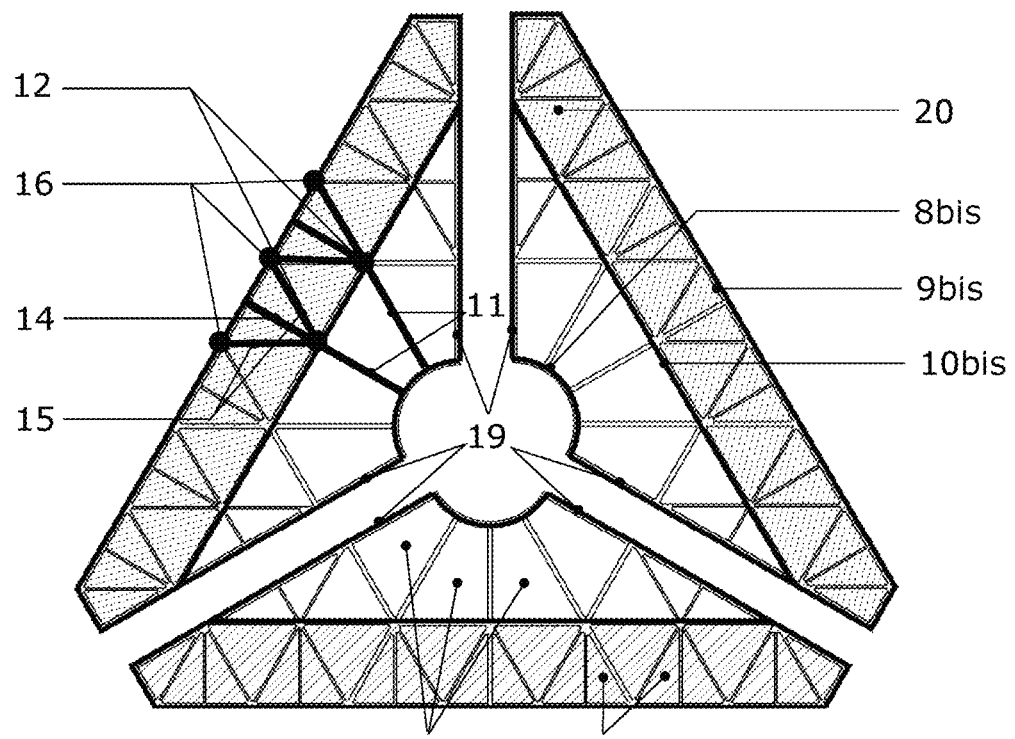
FIG. 2b shows a plan view of the invention made up of three caissons where the proposed structural system and the distribution of the loads transmitted by the wind turbine are shown. It is made up of the same elements, except.
Figure 3A:
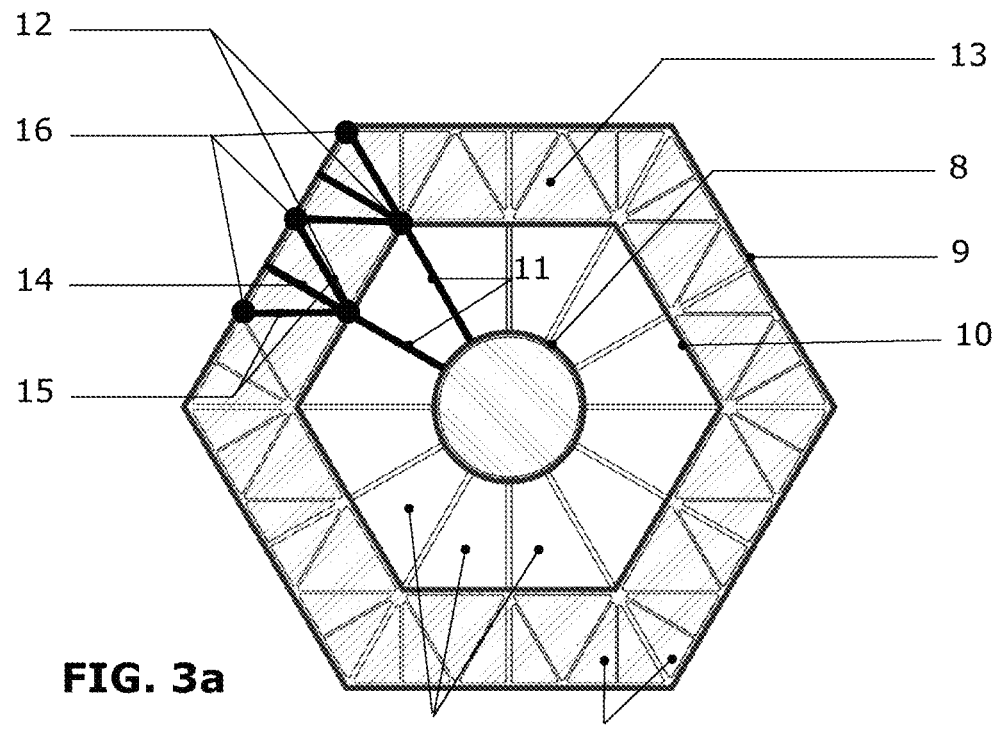
Figure 3B:
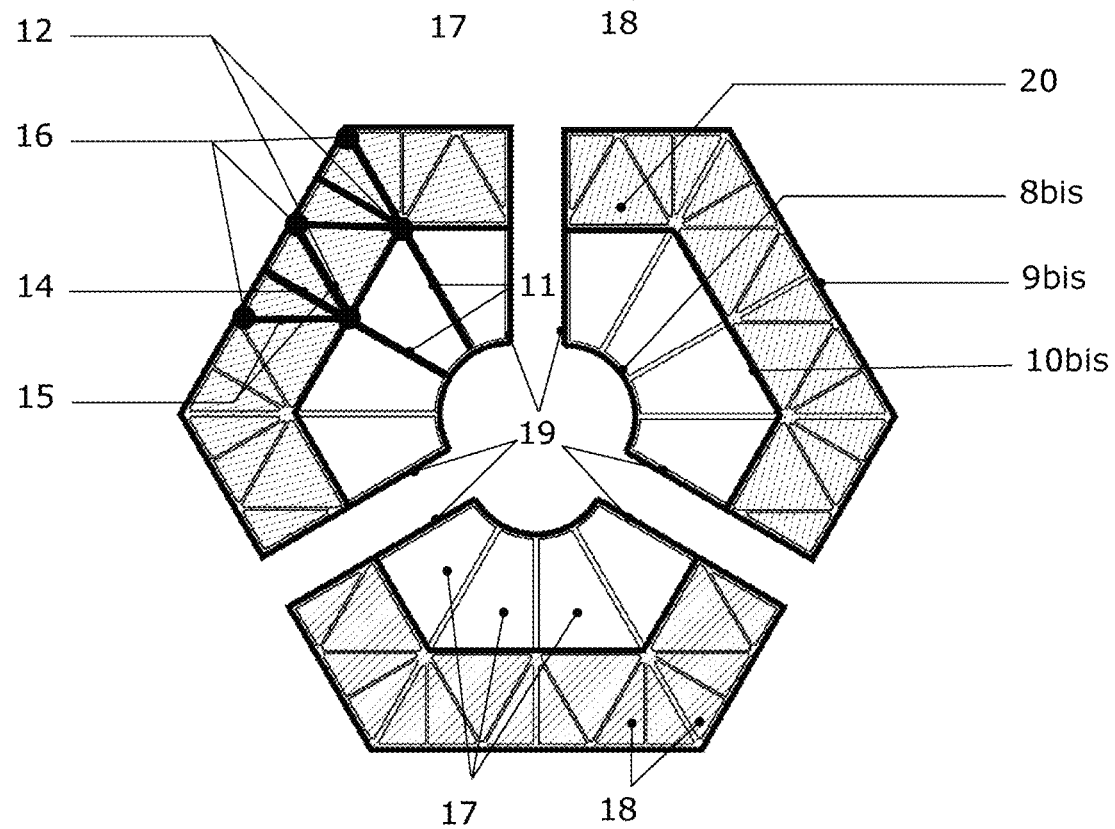

FIG. 3b shows a plan view of the invention made up of three caissons that form a hexagonal base and where the proposed structural system and the distribution of the loads transmitted by the wind turbine are shown. It is made up of the same elements as FIG. 2b.

Figure 4A:
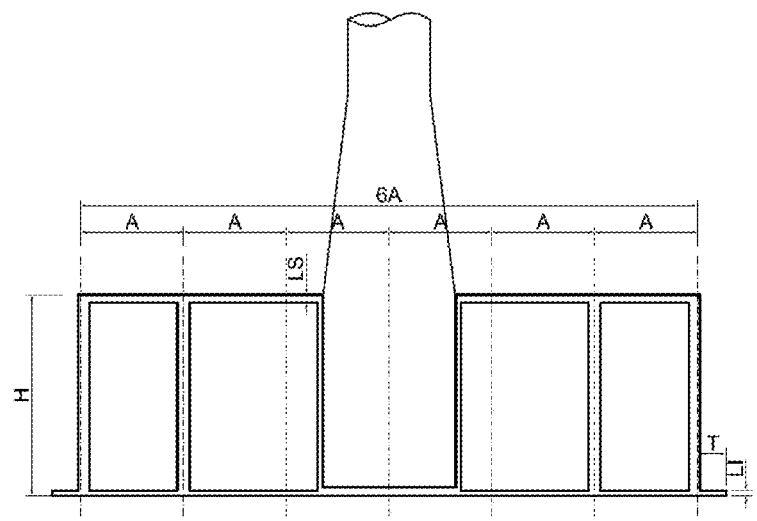

FIG. 4a shows a cross-sectional view of the invention where the modulation of the structure is shown, and a chamfered triangular base with three sides of 7 A and another 3 sides of A in length is represented.

Figure 4B:
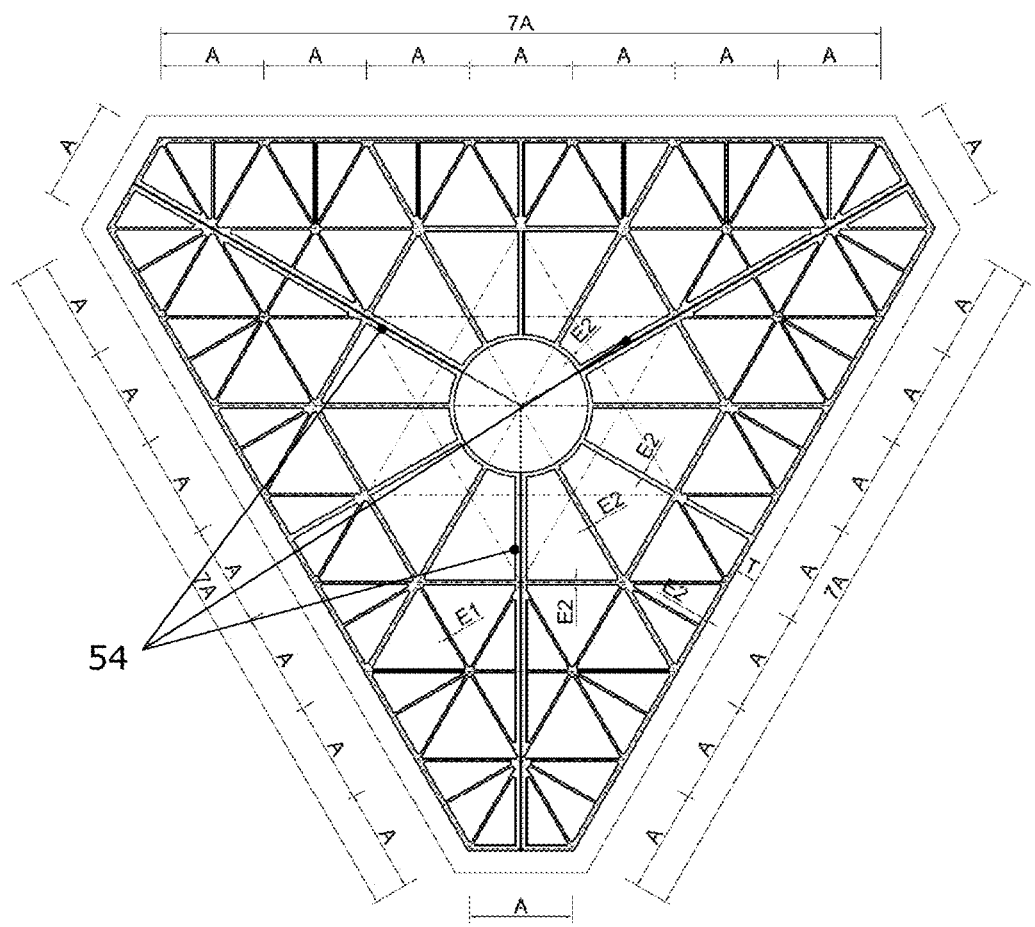

FIG. 4b shows a plan view of the invention where the modulation of the structure is shown, and a chamfered triangular base with three sides of 7 A and another 3 sides of A in length is represented. The arrangement of the three highly rigid radial walls has been indicated, which, in the case of being made up of three caissons, are the double joining walls 54.

Figure 5:
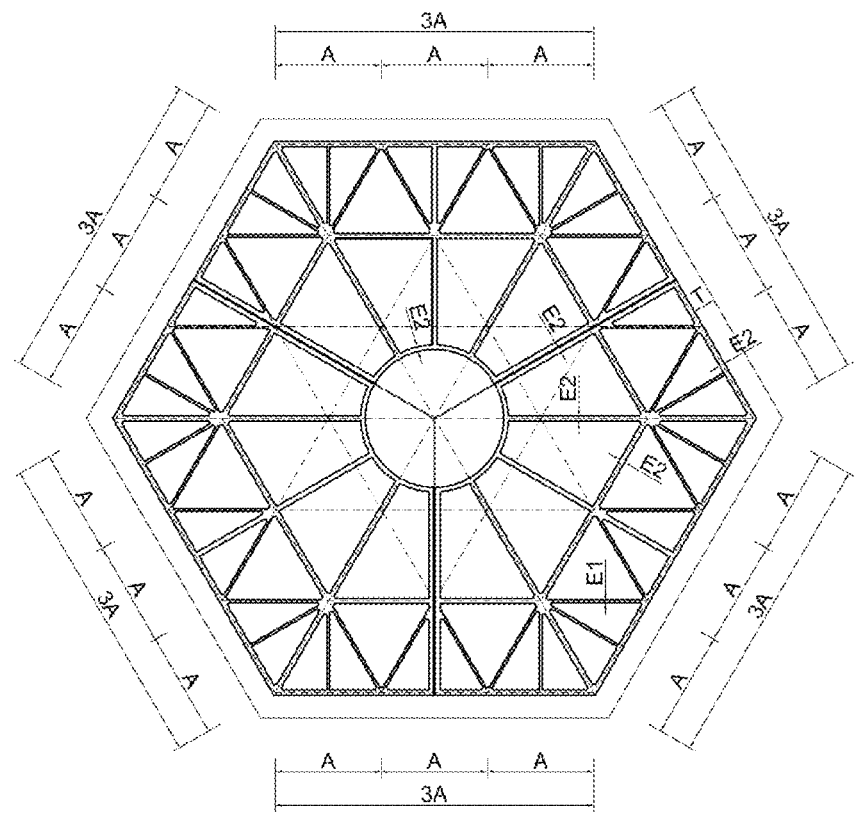

FIG. 5 shows a plan and cross-sectional view of the invention where the modulation of the structure is shown, and a hexagonal base with six sides of 3 A in length is represented.

Figure 6:
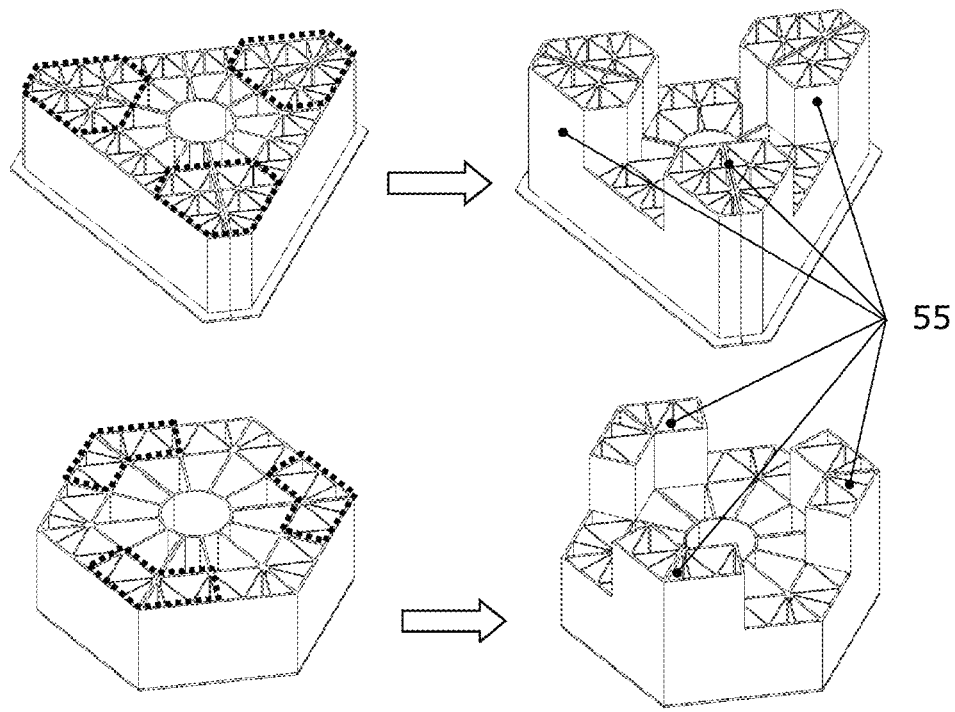

FIG. 6 shows a perspective view indicating the external cells that can be increased to form towers 55.

Figure 7:
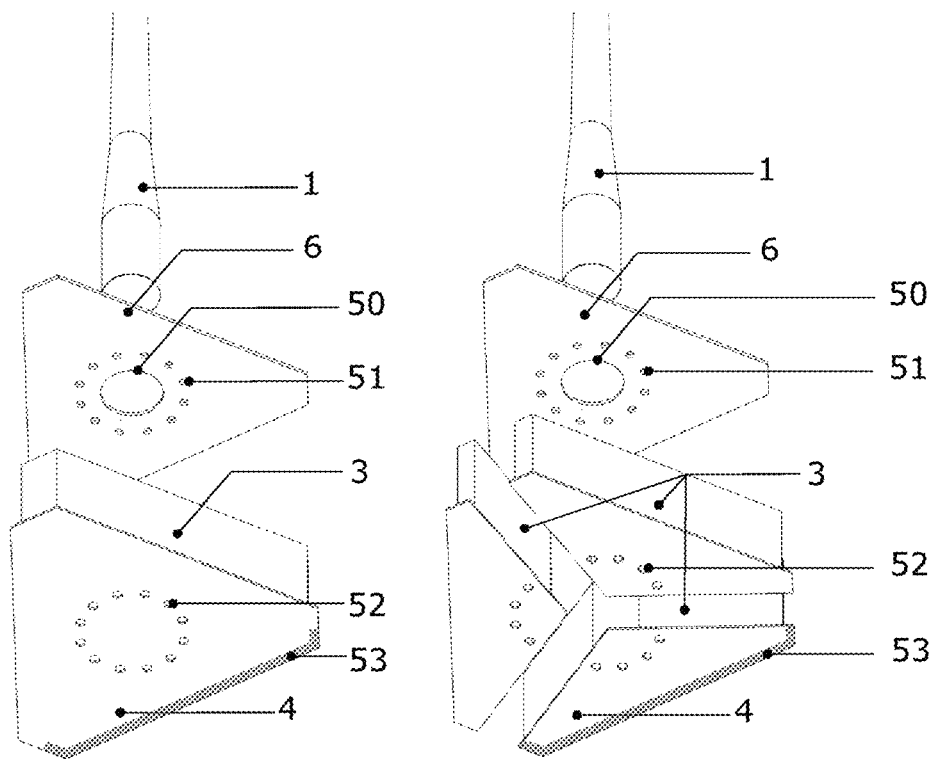
Figure 8:
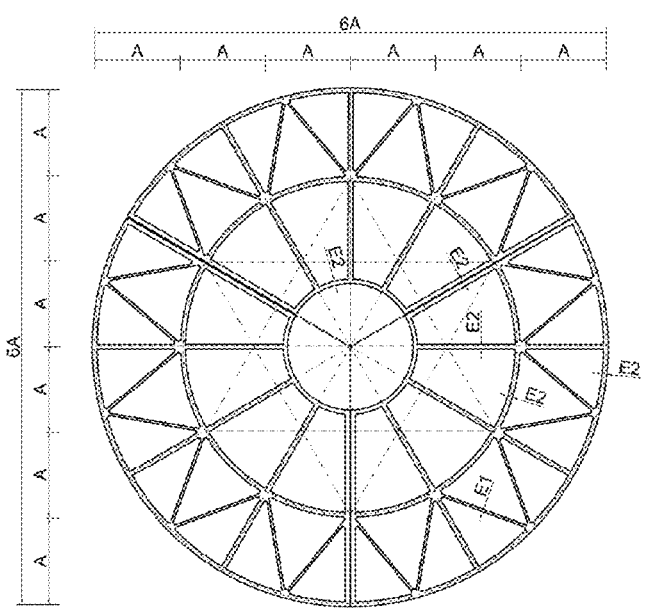

FIG. 7 shows a bottom perspective view of the platform, in both configurations where the following elements stand out:

50. Opening in the upper plate to insert the foot of the tower
51. Openings in the upper plate located in the centre of the central cells
52. Openings in the lower plate of the single caisson or the three caissons, located in the centre of the central cells
53. Shock-absorbing tabs formed by the extension of the lower plate FIG. 8 shows a plan view of an alternative of the invention with a circular shape of 6 A in diameter where the modulation of the structure is shown.

Figure 9:
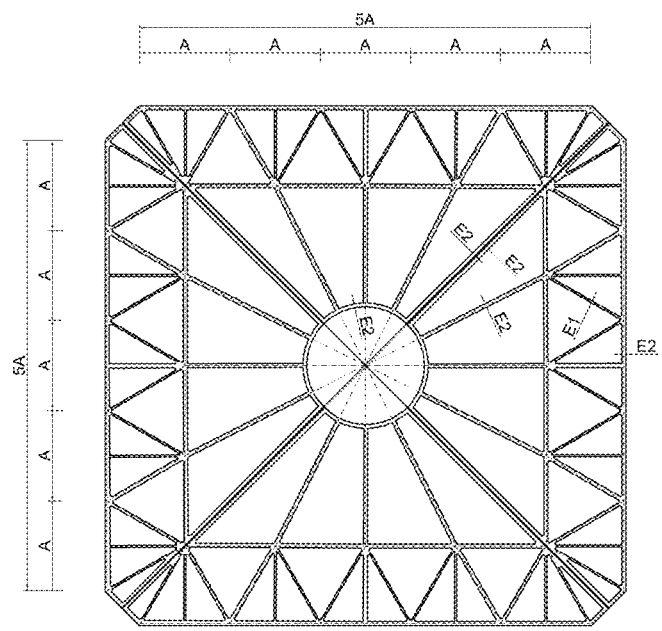

FIG. 9 shows a plan view of an alternative of the invention with a chamfered square shape of sides measuring 5 A where the modulation of the structure is shown.

Figure 10:
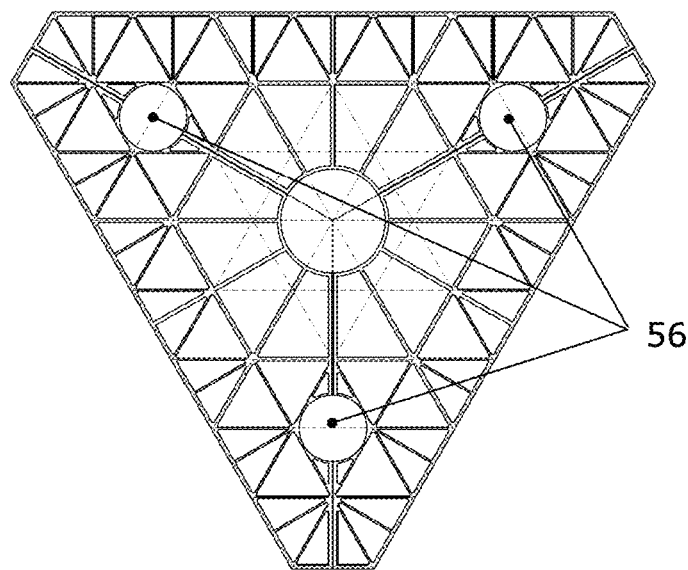

FIG. 10 shows a plan view of the base configuration of the invention with three added circular cells 56 that are used to support buildings, substations or other installations that require more supports.

Figure 11A:
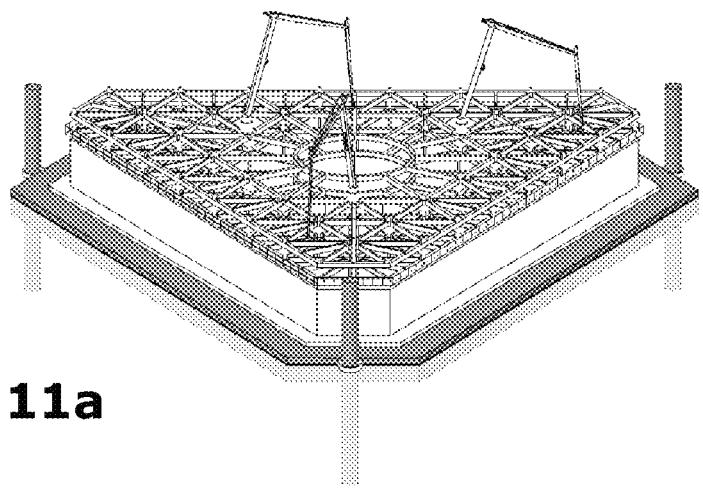

FIG. 11a shows a perspective view of a "caisson plant" floating dock constructed expressly for the construction of the platform in one piece.

Figure 11B:
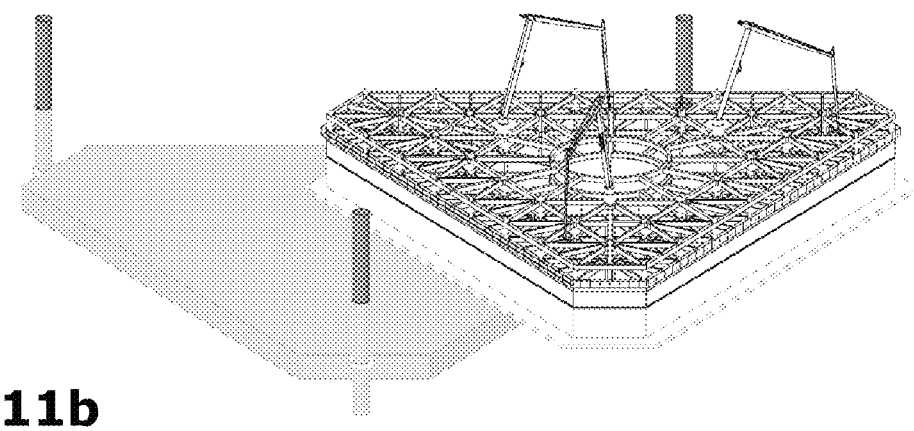

FIG. 11b shows a perspective view of the construction of the platform in one piece, which, already having sufficient freeboard, is freed from the already submerged floating dock.

Figure 11C:
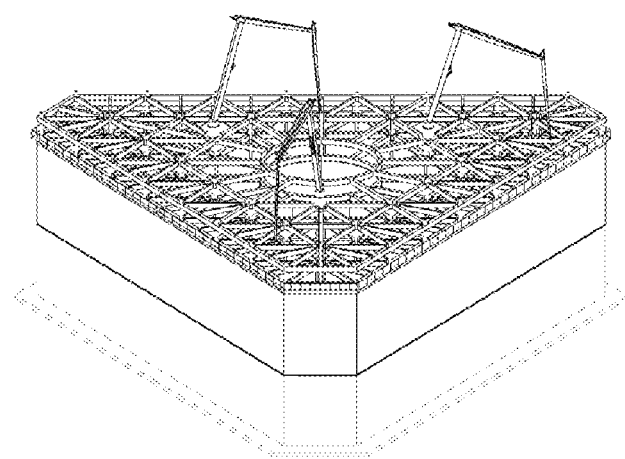

FIG. 11c shows a perspective view of the construction of the platform in single floating piece, where concreting continues on the sliding formwork.

Figure 12:
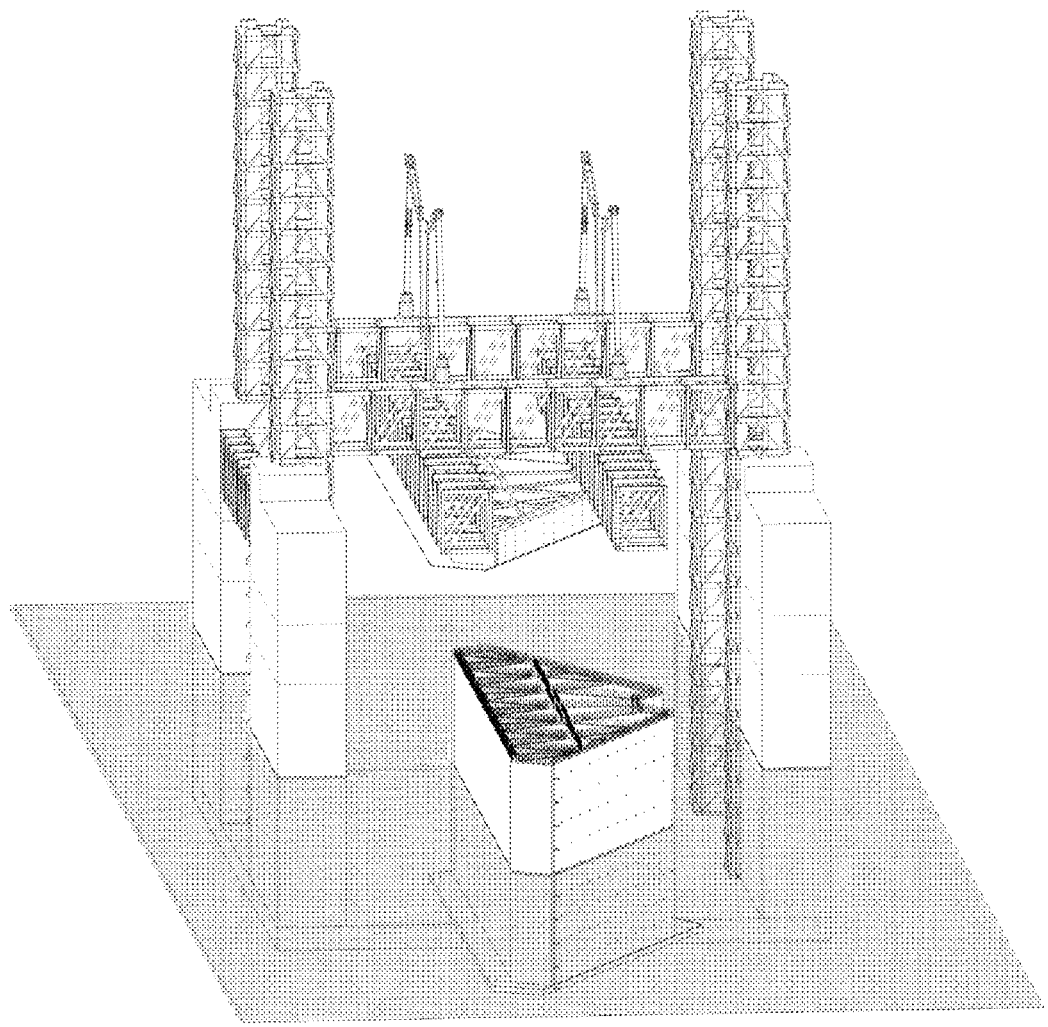

FIG. 12 shows a perspective view of the construction of the platform in three pieces by means of a "caisson plant" floating dock with one of the three pieces already finished that is floating.

Figure 13:
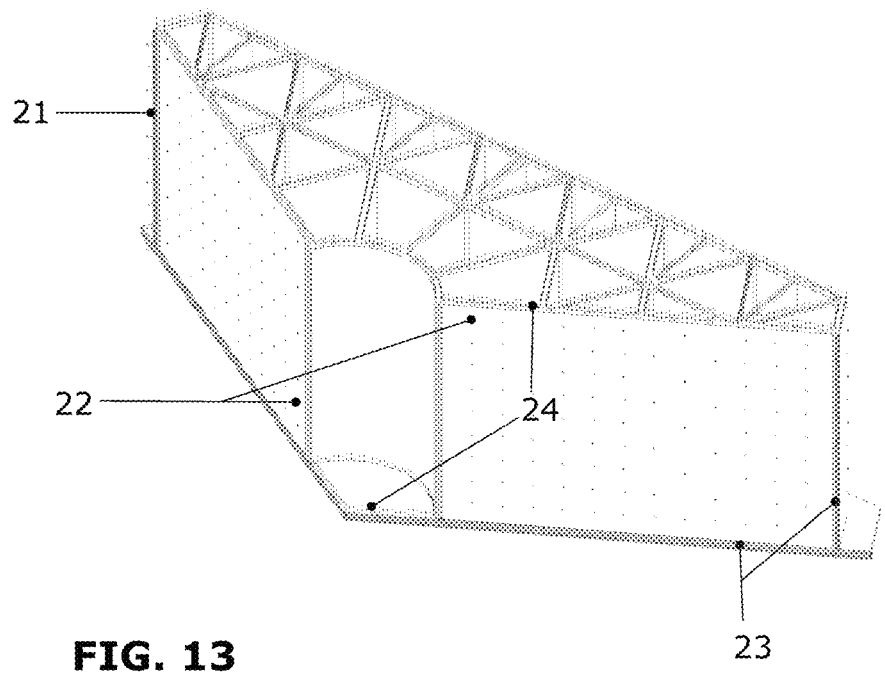
Figure 14:
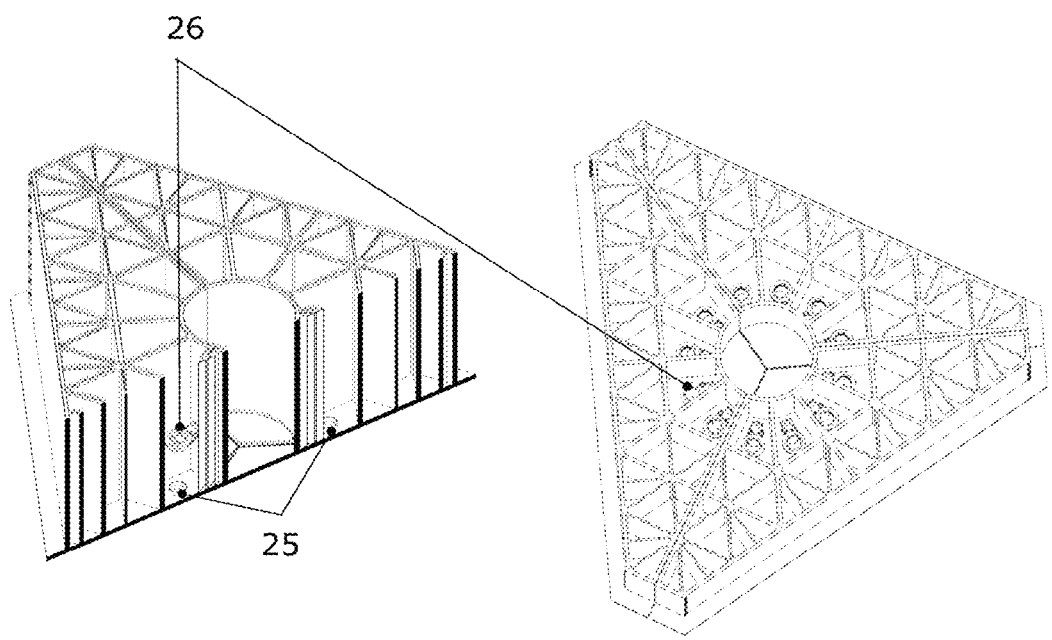

FIG. 13 shows a perspective view of one of the caissons that make up the structure, prepared for connection thereof. It consists of the following components:

21. Embedded sheaths for the joining cables
22. Side holes
23. Waterproof joints that dampen and make the connection between caissons watertight
24. Reinforcement bars FIG. 14 shows a perspective view of the three sectioned and unsectioned caissons that are already joined, indicating the arrangement of hollow, preferably steel cylinders 25, and that of the corresponding closure 26 thereof, which can be of any type such as covers, gates, butterfly valves or the like.

Figure 15:
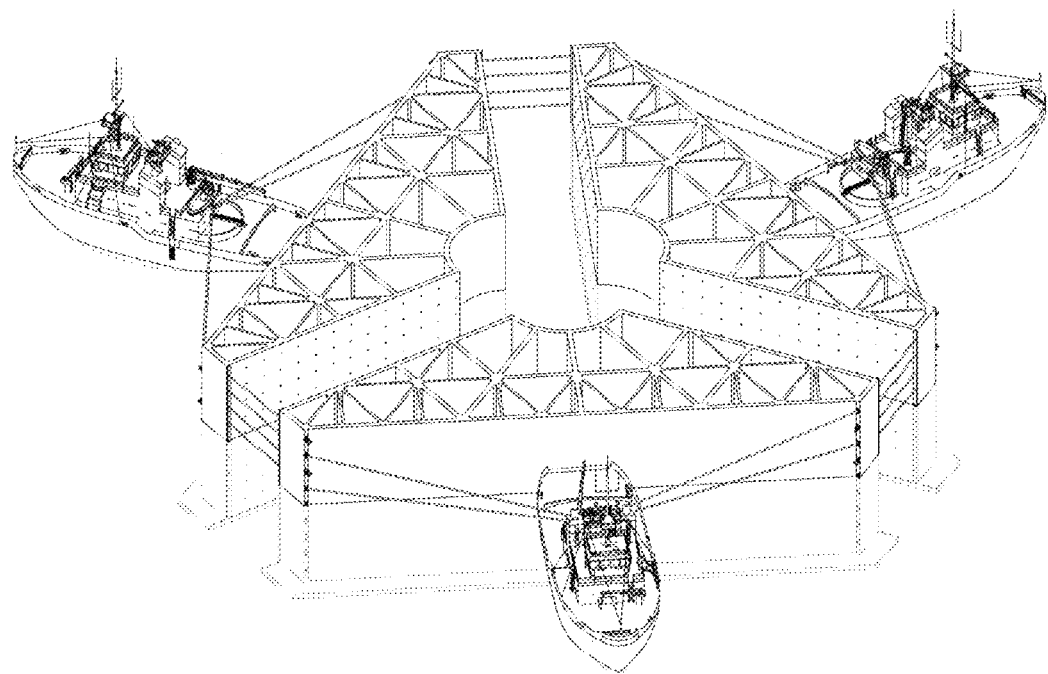

FIG. 15 shows a perspective view of the joining process of the three caissons, where three tugboats are shown approaching the caissons while pulling the cables previously inserted in the sheaths of the ends.

Figure 16:
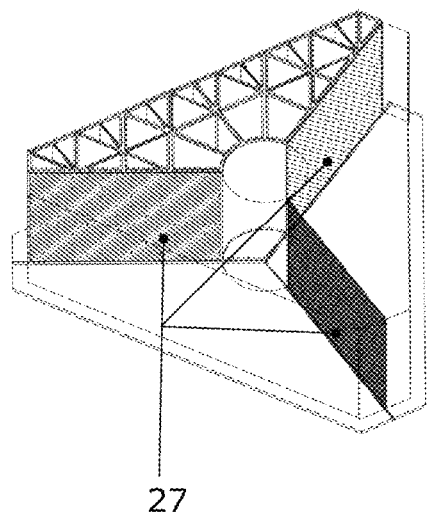

FIG. 16 shows a perspective view of the regularisation grouting 27 that is carried out in the chambers located between caissons that are formed with the previously installed waterproof bands.

Figure 17:
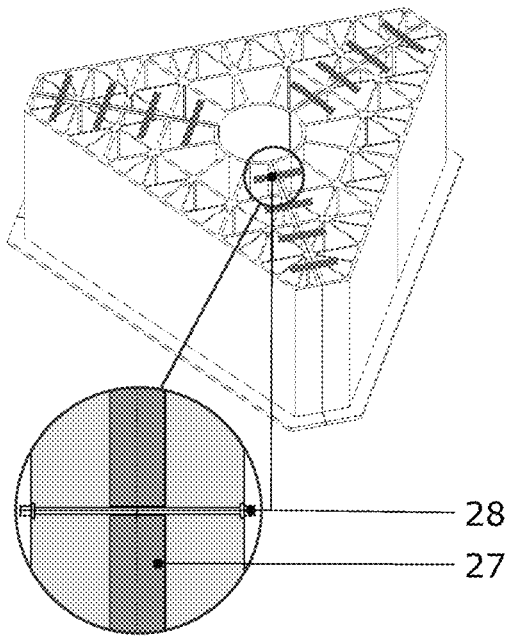

FIG. 17 shows a schematic perspective view of the insertion of the pins 28 into the holes of the joining walls.

Figure 18:
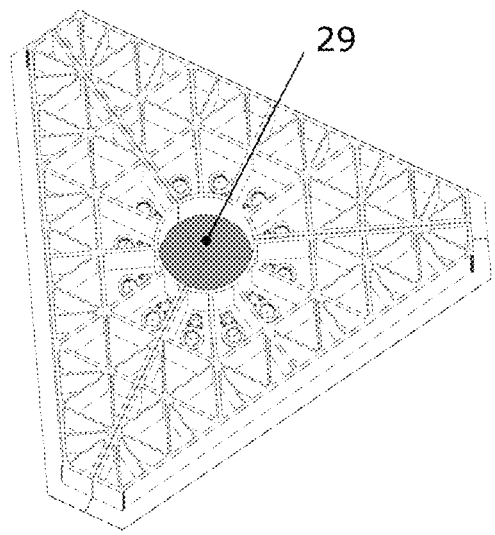

FIG. 18 shows a perspective view of the three joined caissons, where the concreting area of the circular lower plate 29 stands out.

Figure 19:
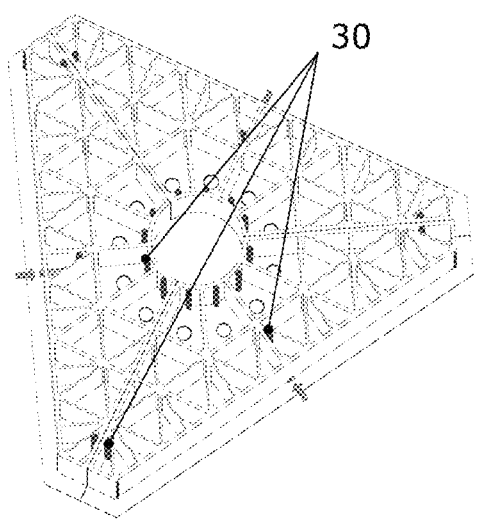

FIG. 19 shows a perspective view of the three joined caissons, where the internal pipes to be installed for filling and emptying cells 30 are located.

Figure 20:
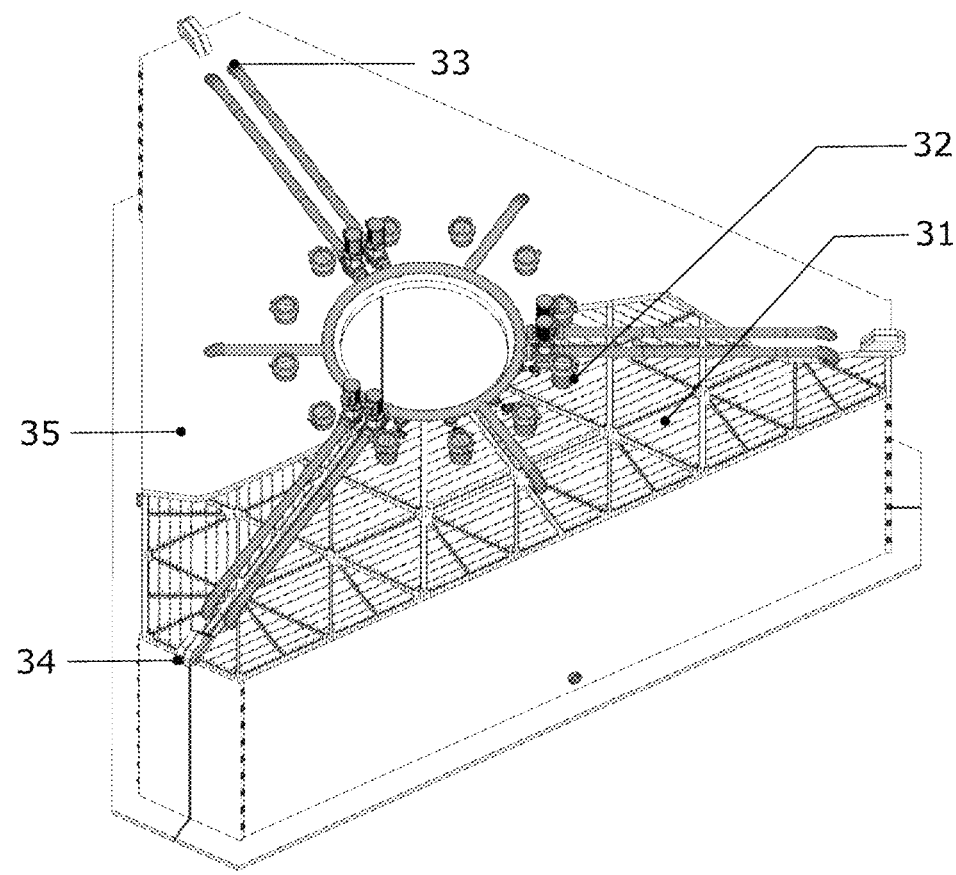
Figure 21:
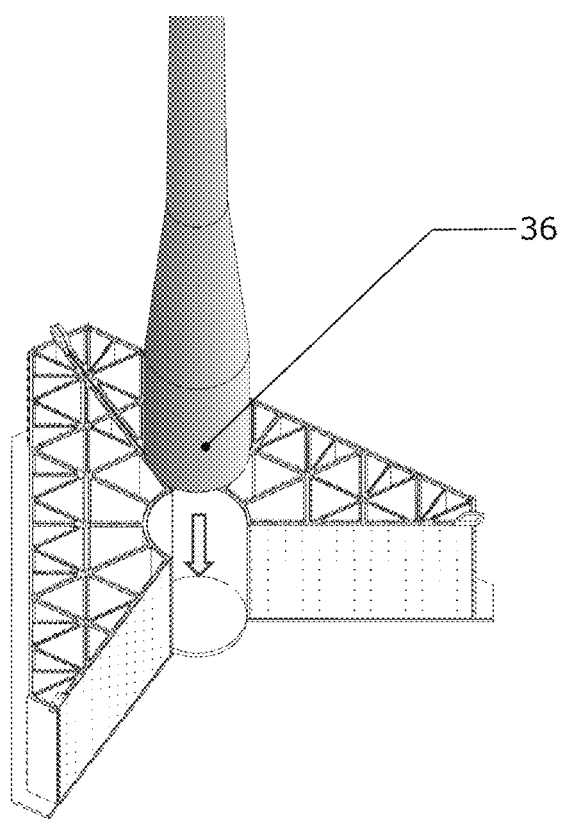

FIG. 20 shows a perspective view of the complete base where the following elements are represented:

31. Pre-plates for the upper portion of the caisson for subsequent concreting thereof
32. Air outlet pipes and valves
33. Ballast water pipes
34. Anchors for mooring lines
35. Concreting of the upper plate FIG. 21 shows a perspective view showing how the superstructure (wind tower) (36) is installed in the central gap that has been formed.

Figure 22:
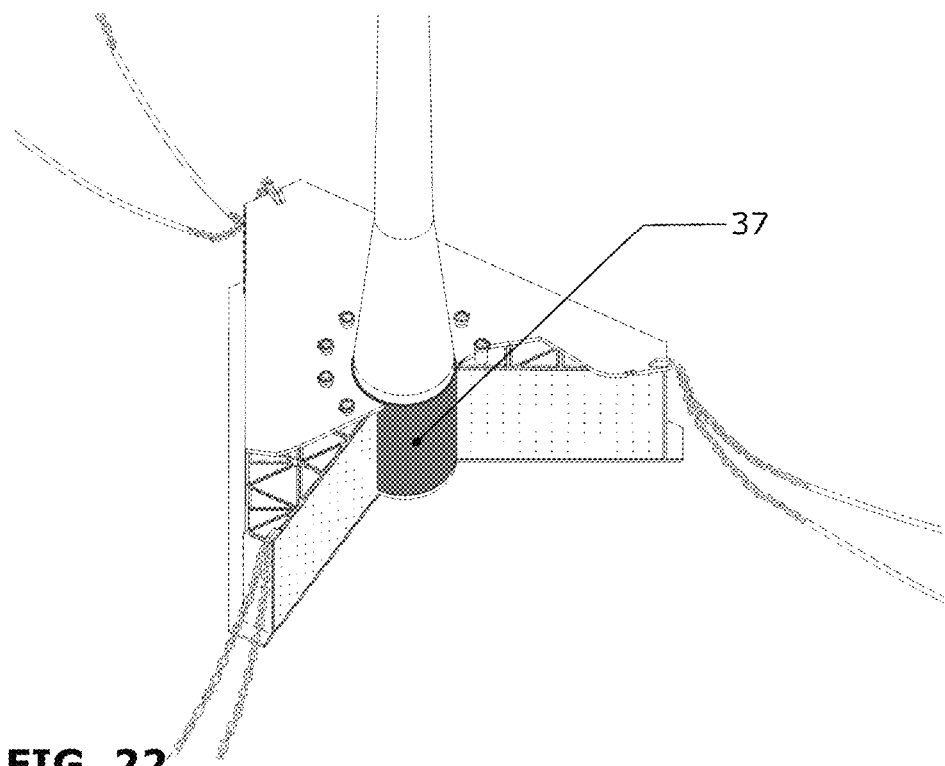

FIG. 22 shows a perspective view where the grouting of the space left between the central circular cell and the shaft of the superstructure 37 is shown.

Figure 23:
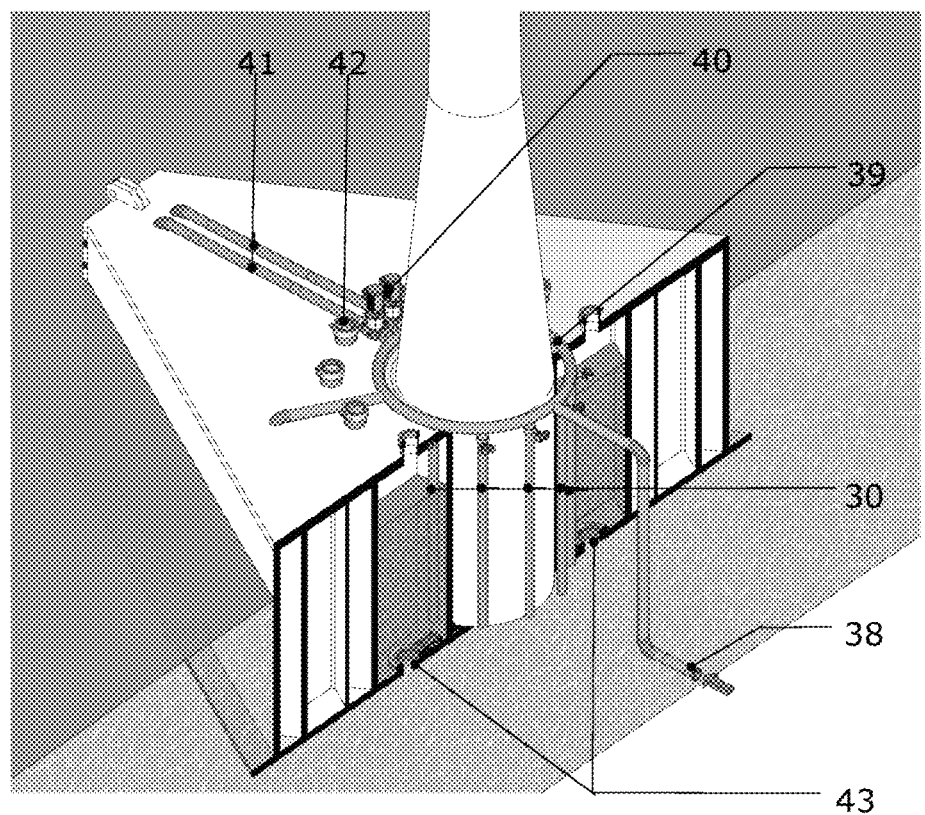
Figure 24:
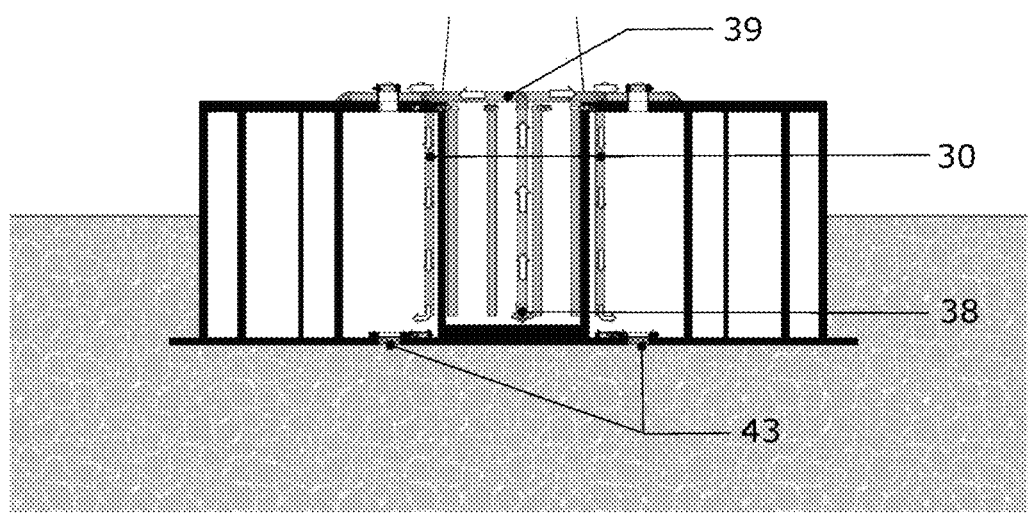

FIG. 23 shows a perspective view where the ballast system that is made up of the following elements is shown:
38. External water intake
39. Distribution ring
30. Pipes with valves for cell ballast
40. Pumps
41. Pipes for the active ballast system
42. Adjustable air outlet
43. Sliding gates for lower water connection FIG. 24 shows a cross-sectional view showing the ballast system where the gates of the lower gaps are closed.

FIG. 25 shows a cross-sectional view showing the ballast system where the gates of the lower gaps are open, when the level of the central cells coincides with the outside.

FIG. 26a shows a perspective view showing the pneumatic damping system where the configuration of the internal cells is reflected when the platform is on the crest of the wave.

FIG. 26b shows a perspective view showing the pneumatic damping system where the configuration of the internal cells is reflected when the platform is in the valley of the wave.

Figure 27:
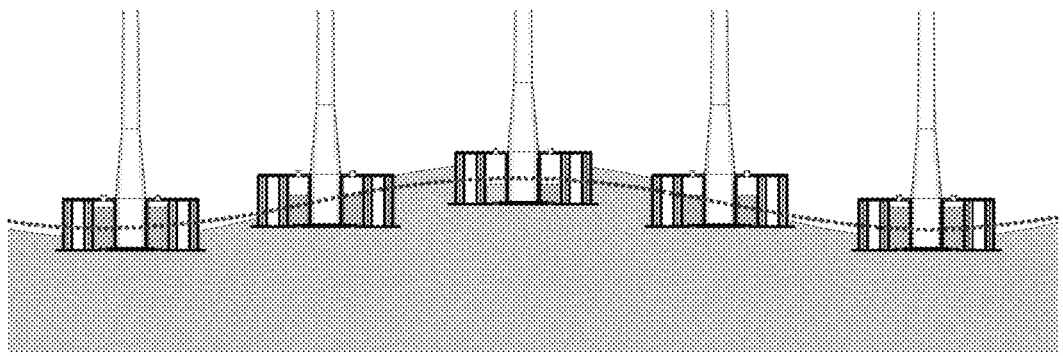

FIG. 27 shows a perspective view where the decrease in the movement of the platform (dotted line) with respect to the profile of the wave (grey area) is represented.

Figure 28:
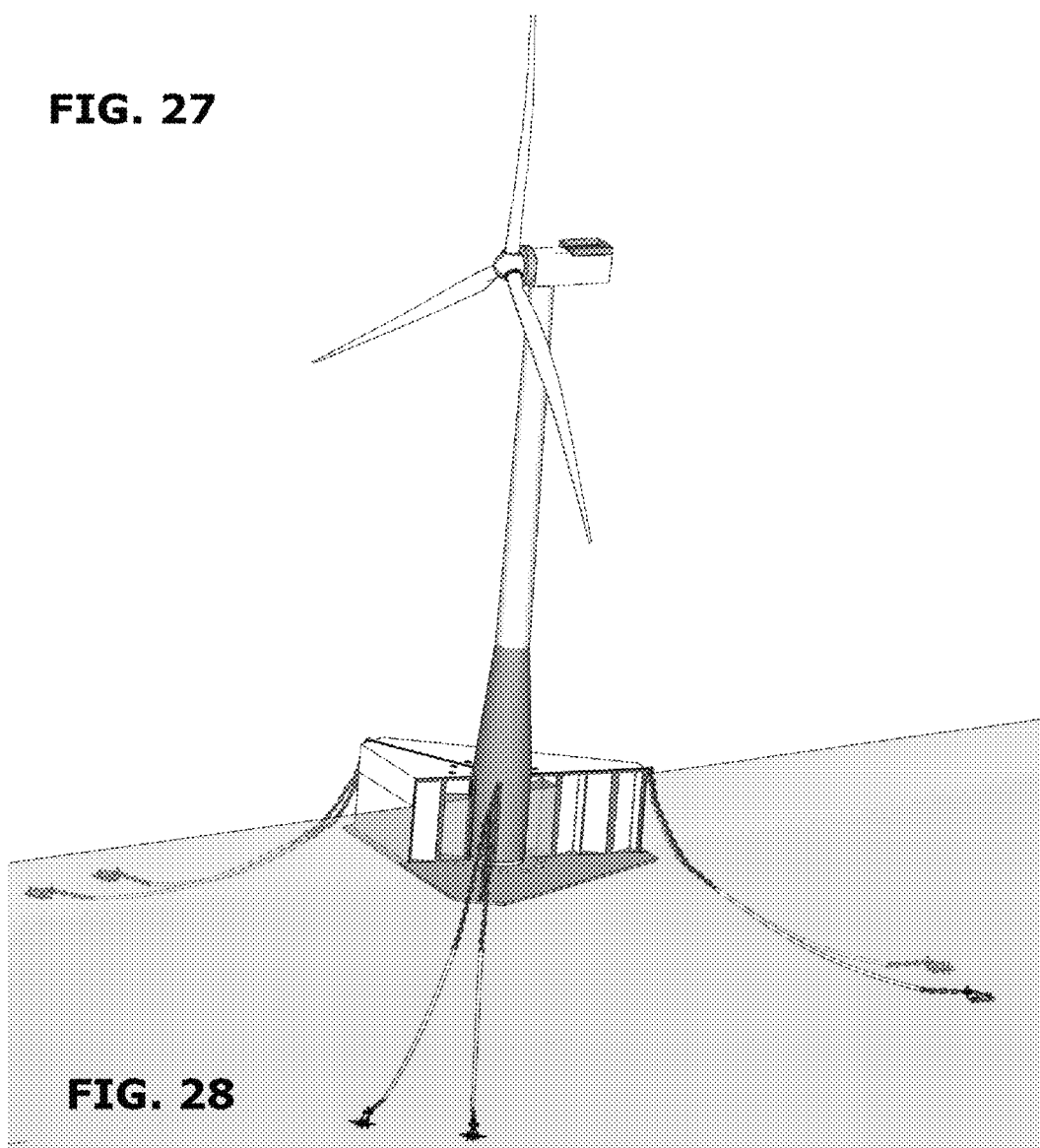

FIG. 28 shows a perspective view where the platform is represented in service state.

Figure 29:
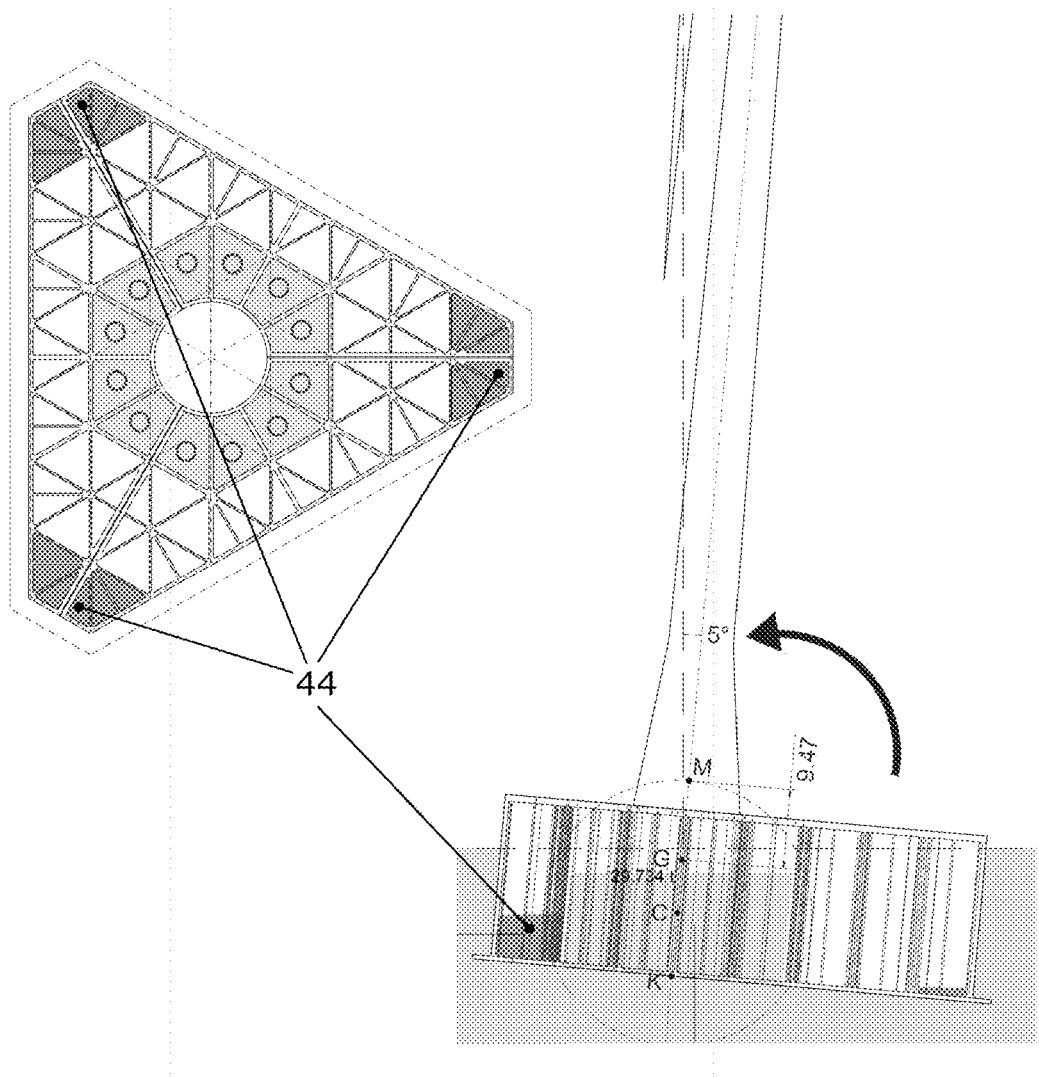

FIG. 29 shows a plan and cross-sectional view where the location of the cells used for the variable ballast system 44 is represented.

DESCRIPTION OF PREFERRED EMBODIMENTS OF THE INVENTION

A. Description of the Structure

The invention is a floating structure for the implementation of buildings, installations and wind turbines in the marine environment, which is distinguished by the two main features that follow:
  A structural system, easy to manufacture, totally safe, highly resistant, with very low bending stresses, low fatigue and great durability.
  A special hydrodynamic operation that captures a large mass of surrounding water, and which translates into optimal behaviour for wind energy production.

It consists of a base 2 formed by one concrete structure (FIG. 1a) or three concrete structures (FIG. 1b) in a prismatic shape, also called "caissons" made up of external vertical facings and an internal pattern of vertical facings that form cells 5 which are closed at the bottom 4 and at the top 6 by plates and which are constructed using floating docks ("caisson plants"), a widely used and proven methodology in the implementation of docks and piers. The caisson plant construction allows for quick and easy implementation of the structure and also leaves it afloat at the end of the process.

The caissons constructed in this way are closed around the entire perimeter thereof, are monolithic, have great resistance individually and float stably with reduced draught.

Any person skilled in port constructions is knowledgeable about what the structures of this type are like and how they are constructed, which usually have regularly arranged rectangular or circular internal cells. Nevertheless, the present invention includes a specific design for the use to which it will be subjected, which notably improves the operating properties, resistance and durability thereof.

One of the greatest structural problems when defining floating concrete platforms that support powerful wind turbines is distributing the great forces transmitted without concentrating the stresses at any point of the base, where the reinforcement would have to be greatly increased, and where a point with a high risk of fatigue and cracking would be established.

Figure 1A:
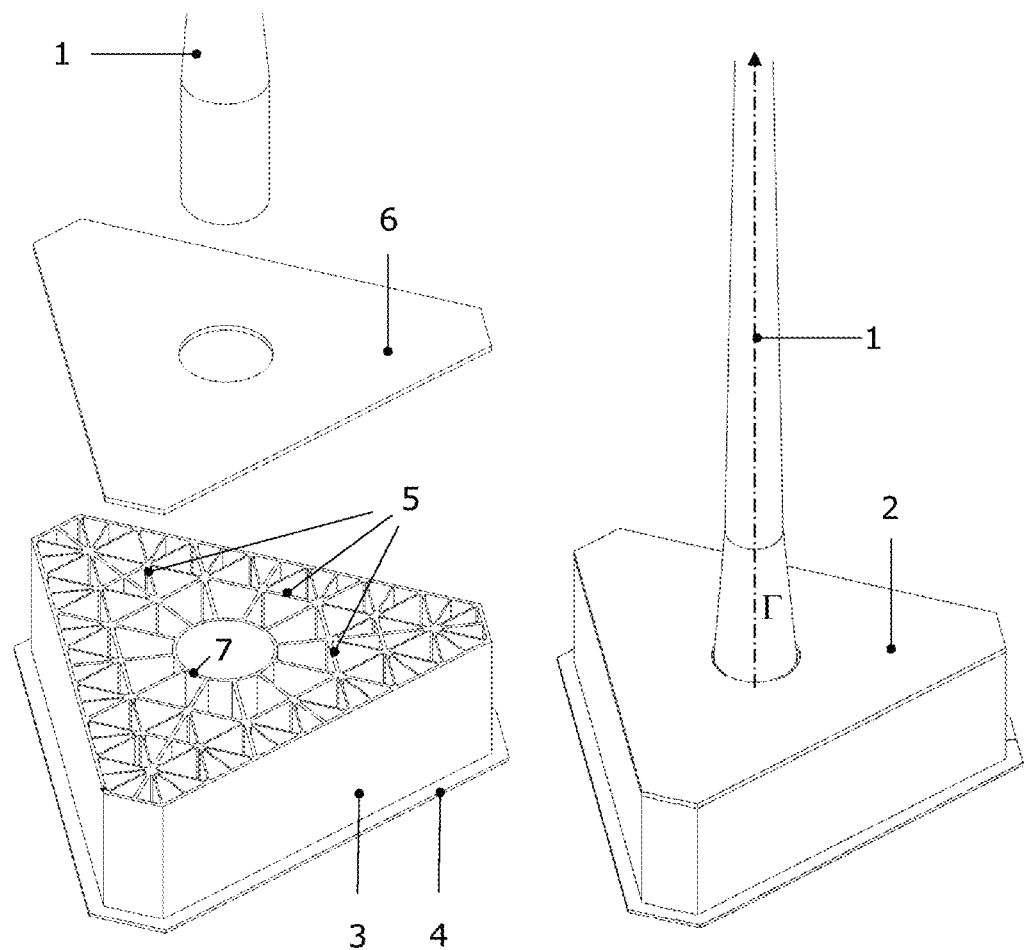
FIG. 1a shows a perspective view of the structure according to the present invention, consisting of a single caisson. The following list includes the essential elements of the piece.
Figure 1B:
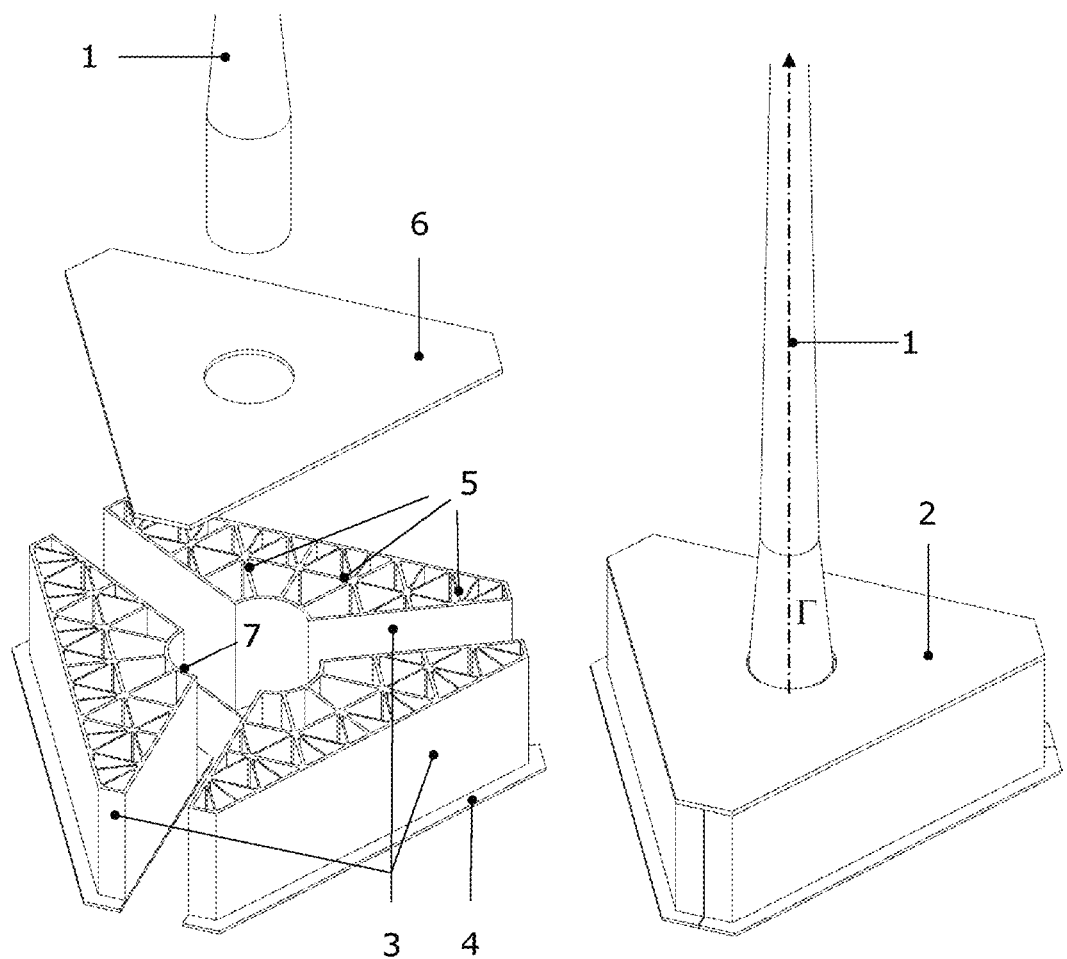
FIG. 1b shows a perspective view of the structure according to the present invention, with the same essential elements except that the base is made up of three caissons instead of one.

Instead of proposing a joining of the tower to the upper plate by means of a series of connection bolts (as is usually done), which would concentrate stresses in the area, the invention proposes completely inserting the shaft of the wind turbine 1 into the central cell 7 up to the lower plate of the platform 4 (FIG. 1a). It therefore consists of transmitting the forces produced by the wind exerted by the shaft of the wind turbine to the walls of the central cell, directly to very large radial screens 11 (FIG. 2a), which in turn are distributed over a very resistant perimeter formed by a mesh of smaller screens that form a grid of equilateral triangles 13. In this way, no part of the structure is over-stressed, which means safety and durability.

To do this, the invention, in the preferred configuration thereof, consists of a base that has a 6-sided polygonal layout, both regular and irregular, and the cells formed by the internal vertical facings have the following features:
  The perimeter of the base is made up of a mesh of equilateral triangles 15 and those that have a side on the outside of the base are divided by another vertical facing perpendicular to the midpoint 14 thereof.
  In the centre of the base there is a large circular cell 8 that will allow it to support the forces transmitted by the superstructure (mainly it will be a wind turbine).
  By connecting the two areas described above, radial facings 11 are arranged which connect the central cell with each of the internal vertices of the triangles on the perimeter.

Figure 2A:
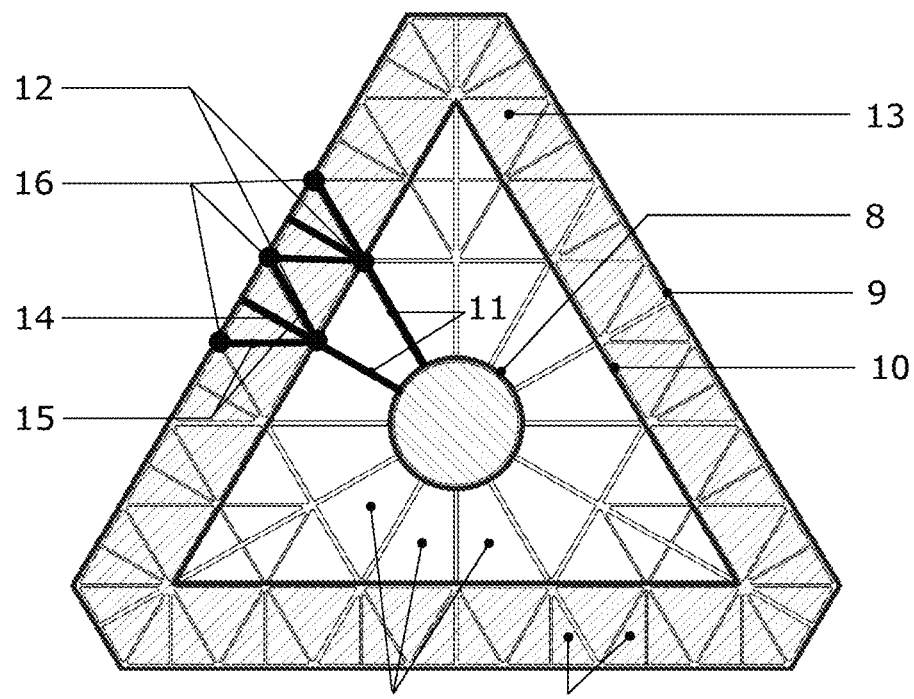
FIG. 2a shows a plan view of the invention made up of a single caisson where the proposed structural system and the distribution of the loads transmitted by the wind turbine are shown. It is made up of the following elements.

FIGS. 2a and 2b show the essence of the proposed structural system, where the loads are distributed in a branched manner throughout the structure, without there being any node that is not branched. It is made up of the following elements:
  an internal wall 8 that defines the housing for fitting therein the foot of the tower
  an external wall 9 that defines the outer perimeter of the body
  an intermediate wall 10 arranged between the internal wall and the external wall
  internal radial ribs 11 that join the internal wall with the intermediate wall in the
  first joining nodes 12
  primary reticular ribs 14 that perpendicularly join the first joining nodes with the external wall
  secondary reticular ribs 15 that obliquely join the first joining nodes with the external wall in the
  second joining nodes 16, the distance A that modulates the structure (FIG. 4b and FIG. 5) being the distance between them.

FIGS. 2b and 3b show the essence of the system in the invention consisting of three caissons. It is made up of the same elements, except:
  joining walls 19 intended to attach the caissons
  a central wall section (8bis)
  an external wall section (9bis) and
  an intermediate wall section (10bis)

In both cases, the internal wall 8 constitutes a housing for the foot of the tower 7, which in the preferred configuration will be cylindrical because it is what is needed to support wind turbines, but in general it can have any other polygonal-based prism shape to house other types of supports for other types of installations or buildings.

The previously described walls and ribbing configure cells that can be classified as internal and peripheral:

The internal cells 17 are those formed by at least one internal wall section, two radial ribs and one intermediate wall section.

The peripheral cells 18 are all the other cells that are not internal and are generally configured by an external wall section, first or second reticular ribs and an intermediate wall section.

The mesh of equilateral triangles on the perimeter forms a highly resistant closure of the platform. It also constitutes a double safety hull, such that any water leak that could be produced by an accidental impact would flood only a very small cell, without any repercussions for the whole.

As can also be seen, this system is in turn optimal for now transmitting the forces of the waves and currents towards the interior of the structure, resisting them without concentrations. The external spans of said mesh are of the order of 4 m with thicknesses of at least 50 cm, much smaller than the external spans of the rest of the existing concrete platforms, which are usually 8 m or more with thicknesses of around 40 cm. This significant difference translates into much lower bending stresses, more resistance and less reinforcement.

It could be argued that this feature is not an advantage because other platforms could do the same thing by simply introducing more facings and increasing thicknesses. But this being the case, it is not carried out in the other solutions because the weight would increase them so much that they would lose stability and all other naval properties.

This means that it is possible thanks to the proposed branched configuration and because the overall design of volumes and weights of the invention allows it.

The perimeter of the base formed by the mesh of equilateral triangles forms a 6-modulated side polygon with the parameter "A", which is the distance between each pair of consecutive secondary nodes:

If three sides have length A and the other three have nA, the result is a chamfered triangle like the one in FIG. 4*b*.

If the 6 sides are equal with length nA, it is a regular hexagon like the one in FIG. 5.

Any other configuration of sides is possible, provided that the aforementioned structure is maintained. As a reference, it can be indicated that the module A can vary between 6 and 14 metres, and the sides of the base from 1 to 10 times A.

Another important aspect of the design of the structure to achieve exceptional resistance to the large actions to which it will be subjected with a low-stressed structure is the arrangement of three highly rigid radial walls 54 (FIG. 4*b*), which join the vertices with the central core.

This platform, as described, can be made up of one or three pieces. In the latter case, the joining walls thereof will be precisely the three large radial walls 54 (FIG. 4*b*). This accomplishes three things:

That the double wall is a large wall with a "bracing" thickness of at least 1 m and with an exceptional rigidity to the structure, minimising the fatigue thereof.

That there is a large contact surface between the caissons to achieve perfect monolithism in the joining That the mooring system can be attached to it and therefore distributed without affecting the rest of the structure (FIG. 22).

For the special hydrodynamic operation that captures a large mass of surrounding water, a series of perforations have been made in the lower plate, in the middle of the central cells 25 (FIG. 14) and pressure control valves in the upper plate 42 (FIG. 23).

As already indicated, almost all existing platforms have heave plates, because it is an effective system for trapping as much water as possible and thus optimising the operation thereof, but it is only used locally in the towers and on the perimeter of the bases. Precisely one of the strengths of the invention is the design of the platform as a gigantic heave plate that traps a large lower mass of water and also a large upper mass that is everything that enters the central cells and the path of the perimeter plate.

Moreover, the opening of the lower gaps in the central cells entails an increase of approximately one metre in the metacentric height of the platform (from 8.50 to 9.47 m), and when external water enters, the floating surface decreases. All of this translates into greater stability and optimal behaviour for wind energy production.

Additionally, it can incorporate an optional system, the pneumatic damping system, which enables the behaviour of the platform to be further improved, which is of great interest in very powerful seas:

The pneumatic damping system consists of shifting the level of the internal cells with respect to sea level by limiting their air inlet and outlet thereof through the passive or automated activation of the pressure control valves 42 (FIG. 23).

a) When the platform is on the crest of the wave (FIG. 26*a*), the central cells have a low level, because the limitation on the outlet of air inside it has slowed down the filling thereof. This implies a significant decrease in the elevation of the structure and therefore in the accelerations.

Over time, the central cells continue to fill, but out of phase with the wave.

b) When the platform is in the valley of the wave (FIG. 26*b*), the central cells have already been filled and have hardly been able to begin emptying because the inlet of the air has been impeded. This implies a significant decrease in the descent of the structure.

The inlet and outlet of air, depending on the wave conditions, can remain constant or can be regulated by a control system that optimises the operation thereof.

FIG. 27 shows the decrease in platform movement (dotted line) with respect to the wave profile (grey area).

The invention can present other configurations that, although with very similar properties, will allow it to adapt to very different scenarios and technical means of construction:

Some peripheral cells are capable of rising above the deck of the base, forming towers that further increase stability. They will not always be necessary because with the base configuration all the required standards are amply covered, and it has the drawback of lacking a large useful deck for maintenance since in this case only the towers would emerge. However, the structural solution and water trapping work in the same way, and even the volume of water displaced can be greater, and therefore with lower accelerations.

FIG. 6 shows how the perimeter mesh of triangles allows for the construction of the towers 55. As already indicated, the preferred construction has sliding formwork in caisson plants and the construction thereof would not have any complexity since it is only necessary to continue concreting the facings that correspond to said towers.

The platform can also have a circular layout, with the same features previously defined, but with perimeter triangles similar to equilateral triangles, with the external and internal sides in the shape of an arc of a circle (FIG. 8).

The platform can also have a square layout (with chamfered corners), with the same features previously defined, but in this case divided into four prismatically shaped concrete structures (caissons) instead of three, and the division will be made by the diagonals thereof (FIG. 9).

The structure, in addition to having a central circular cell, can have another three smaller ones, regularly distributed and with the same features defined previously to be able to house other supports of the superstructure (FIG. 10). These supports will be necessary when the structure to be supported is not a wind turbine but a building, a substation or any other type of installation.

Another option is that the structure, once it is towed by flotation to the service area, is completely ballasted with seawater to rest on the seabed.

When it is not possible to have a caisson plant floating dock with sufficient dimensions for the construction of the platform, it can be constructed, using prefabricated elements or with sliding formwork, on a pier with a launching system or on a dry dock capable of housing the construction.

Some values that can be used to assess the naval stability and suitability thereof for energy production are:
Initial metacentric height=9.47 m
Displacement=29,734 t
Restoring torque for 5°=24,541 t m
Restoring torque for 10°=48,896 t m
Restoring torque for 20°=63,333 t m
Every 170 m3 of transferred water expand=7,000 t m Taking into account that the horizontal force exerted by the wind at maximum energy production on the hub of a 10 MW DTU turbine is 150 t, this would entail a destabilising moment of 18,000 t m, which can give us an idea of the small inclinations that the platform will undergo, and therefore the great energy production.

B. Description of the Construction, Assembly and Commissioning Method

The proposed construction system consists of two methods:

Method 1: "One Piece Construction".

When it comes to large productions for wind farms of around 700-1000 MW, where the initial investment in constructing the infrastructure is divided into many units, the construction of a special caisson plant floating dock, with these unusual dimensions for the joint construction of the entire platform, is profitable.

Method 2: "Construction from Three Pieces"

When it comes to constructing a few units such as a prototype or nearshore power supply installations for ports or industries, and the investment in a very expensive caisson plant dock is not justifiable, it can be built in three pieces using existing caissons of smaller dimensions.

Method 1

The first method, used for mass production, consists of four blocks:
1. Construction of the structure in one piece
2. Assembly of the supporting superstructure (usually a wind turbine).
3. Commissioning suited to the conditions of implementation.
4. Disconnection and refloating for maintenance or dismantling.

1. Construction of the Structure in One Piece

When the construction volume justifies it, a floating dock of the necessary dimension for the construction of the platform will be previously constructed.

Said floating dock will preferably have a platform-like shape, somewhat larger in layout to save material, but it can also be made rectangular by joining existing pontoons. On the faces that are needed, guides would be fixed to the seabed which stabilise the dock when it is ballasted with water to release the structure (FIG. 11a). It can also be stabilised by flotation using submersible towers arranged in the corners.

The construction is carried out in the following phases:
Placement of the reinforcement of the lower plate and concreting
Placement of sliding formwork for the construction of vertical facings
Concreting of the facings until the structure has sufficient buoyancy to have a safe freeboard to continue concreting outside the caisson plant
Ballasting of the caisson plant until the caisson is released and moored to the pier to continue concreting while floating (FIG. 11b)
Concreting while floating using sliding formwork for the rest of the structure (FIG. 11c)
Once the entire strut of the structure has been concreted, the sliding formwork is removed, the pre-plates are placed, and the upper plate is concreted This system allows for very efficient construction, being able to carry out this process in a single week, leaving the completely finished structure already floating.

2. Assembly of the Supporting Superstructure (Usually a Wind Turbine).

For the installation of the wind tower, substation or building that supports the platform, the following steps are followed:
Insertion of the superstructure (wind tower) 36 into the central gap that has been formed (FIG. 21). This is an important innovation, since it involves replacing the usual joining of the tower that is usually carried out by means of a large flange that is screwed to a bolt cage embedded in the walls of the platform. This joining is highly complex, requiring great construction precision, and moreover, it entails a significant concentration of stresses in the area. On the other hand, this solution is extremely simple, requires much less restrictive tolerances, and distributes the loads without concentrations.
Grouting of the space that remains between both 37 (FIG. 22). This step, which is similar to the one usually carried out for joining monopiles and the transition piece but is now used in joining the shaft with the platform, allows for integral joining between both elements.

3. Commissioning

The process consists of the following phases:
Towing and positioning of the platform by means of three tugboats. The platform is moved with one or two conventional tugboats that pull it, and a third one that remains in the back to avoid possible side drifts that may occur during displacement. Subsequently, the same three tugboats will allow coupling to the previously installed moorings and positioning the platform in the service location thereof.

Ballasting with water through the installed pumps

The ballast system will vary depending on the type and shape of the maritime structure in question, but it will always be made up of elements similar to those shown in FIG. 23:

External water intake 38
Distribution ring 39
Pipes with valves for cell ballast 30
Pumps 40
Pipes for the active ballast system 41
Adjustable air outlet 42
Sliding gates for lower water connection 43

Ballasting is carried out by introducing water from the outside by means of pumps 40 from the intake 38, and by means of the distribution ring 39 and the pipes with valves 30; the central cells are filled so that when the pressure is the same as the outside, the gaps arranged in the lower plate can be easily opened by means of sliding gates or the like 43 (FIG. 23).

The commissioning method is as follows:
The central cells are filled until the internal water level is equal to sea level.
The lower gates are opened, connecting the central cells with the sea. There is another possible configuration of the invention, where the central cells are not connected to the outside, such that the platform would not have gaps in the lower plate and therefore this point and the next would be omitted.
The upper air outlet required to achieve pneumatic damping adapted to the waves is adjusted.
The cells located at the vertices of the base 44 (FIG. 29) are slightly filled for the operation of the variable ballast system that is carried out by the pipes 41 (FIG. 23).
Connection (plug and play) of the previously pre-installed mooring lines. One of the most important features of the invention is its ease of commissioning and removal since it is only ballasted with seawater. Moreover, the mooring lines can be easily connected and disconnected with the help of conventional tugboats alone. This allows the platform to be brought back to port whenever necessary.
Electrical connection (plug and play). In the same way, the power line can be connected and disconnected by means of submarine electrical connection hubs that are also pre-installed to enable the uncoupling thereof.

4. Disconnection for Maintenance or Dismantling

The process consists of the following phases:
Fixing of the platform by means of three tugboats.
Electrical disconnection and fixation for subsequent use.
Disconnection of mooring lines and fixation for subsequent use.
Closing of the gaps in the lower plate.
Emptying of the ballast water from the cells by means of the installed pumps, or by means of the injection of compressed air, which causes the structure to refloat.
Towing of the structure to port.

Method 2

The second method, which allows for a few units to be produced, is a process similar to the previous one, with the difference that the base is constructed from three separate pieces that are subsequently connected monolithically by the concreting of the upper plate and a portion of the lower plate, also, if necessary, by means of joining bolts.

This method requires three specific processes:
1. Construction of the elements that make up the structure
2. Preparation of the structure for the subsequent assembly thereof
3. Assembly of the previous elements The assembly of the superstructure (wind turbine), commissioning and disconnection would be identical to method 1.

1. Construction of the Elements that Make Up the Structure

As described above, the greatest difficulty encountered when constructing any of the existing platforms that have to support buildings, installations or 12 or 15 MW wind turbines is that they have enormous dimensions (around 50 m in diameter) and major actions to support.

Specialised shipyards and ports currently have means that could serve these purposes, such as:

Syncrolift and launching ramps: they would allow the platform to be built on the pier and transported with a rail system, spmt trailers or very large cranes to the launch area, where they could be floated. It is a complex construction system, but it is the one proposed by several existing solutions. The fact is that none of these means are constructed with a beam of 50 m which is what would be required.

Dry docks: in principle it is the simplest system to solve the problem, but currently there are very few dry docks that have the required dimensions. It would therefore be necessary to carry out a large excavation in a port area and provide a series of gates and waterproofing that would entail a high extra cost.

In any case, these means are very scarce and expensive, creating a bottleneck when it comes to meeting deadlines in large implementations.

For the manufacture thereof, it is therefore currently necessary to previously construct specific installations that allow the work to be carried out and allow for a transport and flotation system with a very high tonnage. This leads to repercussions on the cost of each unit, which could be compensated for in large wind farms, but never when it comes to manufacturing few platforms.

As explained, for concrete solutions, an ideal form of construction would be under the port caisson construction technique (using a "caisson plant"), but there exists the significant problem of not "fitting" in any of the existing floating docks.

For this reason, the present invention proposes breaking down the platform into several elements that are watertight, resistant and self-supporting, and which could be constructed in the numerous transferable floating docks existing for the construction of caissons.

For the construction of the previously defined caissons, the port caisson system will be used via the use of a floating dock. The construction may also be carried out both in dry dock or on a platform on the pier that will be subsequently floated, but in all cases the concreting would be carried out using the sliding formwork system (it could be constructed with prefabricated flat pieces and subsequently concreting the joints, but only if no other means are available).

The "caisson plant" floating dock has a perfectly designed infrastructure, which raises the formwork by means of a system of hydraulic jacks, such that it has the great advantage of being able to place the concrete in the formwork in small layers, in addition to being able to compact it and ensure the joining thereof with the previous layer under perfect conditions, removing the concreting joints. Moreover, once the caisson has been constructed, it floats in a stable way (FIG. 12), which is a very important operational advantage.

This entails great robustness and monolithism in the constructed structure, which makes it ideal for withstanding the pounding of waves and wind, as well as great resistance to accidental impacts from ships or icebergs. On the other hand, in the floating concrete platform solutions that are currently being designed on the market, to achieve performance that is somewhat similar to that of the caisson plant, prefabricated elements are used whose joints are susceptible to failure, and therefore have a much lower resistance.

2. Preparation of the Structure for the Subsequent Assembly Thereof

Each of the modules that make up the structure must be prepared for subsequent connection therebetween. For this, the side holes 22 (FIG. 13) and embedded sheaths 21 necessary to introduce the cables that will join them monolithically must be left. The position and quantity of the sheaths and holes will depend in each case on the stresses due to the superstructure and the environmental conditions where it is located. The position of the side joining holes has been provided in the arrangement of the reinforcement, but only a recess of about 5 cm is left on the facing, which serves as an indication of the position thereof. Inside this cutout, a perforation will subsequently be made when the caissons are firmly joined by the cables located at the ends thereof, and the gap that remains between the facings has been completely filled with grout (a process that will be explained later). Finally, the pins will be introduced, achieving an integral joining.

In some cases, if necessary, inside the lower plate or a side wall, a series of sheaths can also be arranged that would be used to introduce post-tensioning cables.

On the internal edge of the lower plate and on the external bands of the joining area, as can be seen in FIG. 13, waterproof joints 23 are arranged which allow the joining between caissons to be sealed. In the upper portion of the caisson and in the lower circular area, the bars of the required reinforcements 24 will be left so that later, when the upper plate and the small circle of the lower plate are concreted, an integral joining between the caissons is produced.

In the lower plate, in the area below the central cells, circular openings of about two metres in diameter will be left, which will allow water to pass to the inside.

To do this, on the lower plate, before concreting, hollow, preferably steel cylinders 25 (FIG. 14) will be arranged which will sufficiently protrude from the upper face thereof so that some type of closure 26 that closes said passage of water can later be coupled.

This closure must withstand the hydrostatic pressure existing on the lower face, and this pressure will always be less than two bars, perfectly bearable with a sheet that is not very thick. This means that many different types of closures, covers, gates, butterfly valves, etc. can be used.

A simple solution is guillotine gates such as those represented in FIG. 14, which can be remotely actuated by small hydraulic jacks to simplify the operation thereof.

3. Caisson Assembly

The objective of the assembly method is to carry out the operations in a reliable and safe way, ensuring the stability of the structure at all times and guaranteeing the robustness and monolithism of the resulting structure.

The process consists of the following phases:

Straightening of the caissons before joining them (to keep them in a horizontal position). It consists of filling some cells of the caisson with a certain small amount of water so that it floats perfectly horizontal.

Approaching with tugboats to the joining position thereof. Each caisson is moored to a tugboat that will position them until they are a short distance from each other, facing the facings where they will be joined. At this time, some cables are inserted through the sheaths located at the ends in such a way that when they are pulled from each of the tugboats, they are brought closer together (FIG. 15).

Final approach and connection by tensioning the cables. When the caissons are already in the joining position thereof, they are tightened successively by means of jacks before being cut and disconnected from the tugs.

Regularisation grouting 27 (FIG. 16) of the chambers located between caissons that are formed between the waterproof bands 23 (FIG. 13) that were installed on the side and lower edges of the facings to be joined.

Drilling in the cutouts that were arranged 22 (FIG. 13) and insertion of pins 28 in the holes made (FIG. 17). Since the chamber that is formed between the caissons 27 is already completely filled with the grout, there will be no problem of water entering through the gaps and the support between caissons is perfectly regularised.

Concreting of a circular lower plate 29 (FIG. 18). This step is very important since it entails the lower joining of the three caissons that will give great monolithism to the structure, and will serve as support for the wind turbine tower. In some cases, if necessary, this joining can be complemented with post-tensioning cables that further reinforce the joining of the lower plate and give it continuity.

Installation of internal pipes for filling and emptying cells 30 (FIG. 19). They will allow for ballasting and deballasting with seawater for the commissioning thereof, as well as for water removal in emergencies.

Positioning of pre-plates 31 in the upper portion of the caisson and placement of reserves for passage of air outlet pipes 32 and ballast water 33 (FIG. 20)

Placement of anchors for mooring lines 34 (FIG. 20)

Concreting of the upper plate 35 (FIG. 20). To do this, a perimeter formwork will be provided to cover the edge thereof, it being secured to the upper portion of the exterior facings. Another option is, in the caisson plant itself, to increase the external facings to the height of the edge of the plate so that they in turn serve as formwork for it.

Installation Example of a 10 MW Wind Turbine

For the installation of a 10 MW wind turbine, the preferred configuration would be made up of a polygonal base with 6 sides, 3 of 7 A in length and 3 of 1 A in length, which form a triangle truncated at the vertices and 20 m of strut with

| the following features: | |
|---|---|
| Dimensions: | 65.60 m length |
|  | 56.80 m beam |
| Dimensions of each caisson when making it in three parts: | 61.90 m length |
|  | 18.20 m beam |
| Base height (H): | 20.00 m |
| Maximum external span (A/2): | 4.10 m |
| Thickness of external facings (E2): | 0.50 m |
| Thickness of internal facings (E1): | 0.25 m |
| Thickness of the lower plate (LI): | 0.50 m |
| Width of the heave plate (T): | 2.20 m |
| Thickness of the upper plate (LS): | 0.80 m |
| Weight of each caisson: | 8,243 t |
| Total weight of the structure: | 28,460 t |

Advantages Derived from the Invention

The proposed construction, assembly and commissioning method has great advantages over other systems that perform the same function:

1. The invention proposes a feasible solution in caisson plant floating docks that allows for quick and simple implementation of the structure in addition to leaving it afloat at the end of the process.
2. Being able to place concrete in the formwork in small layers, in addition to being able to compact it and ensure the joining thereof with the previous layer under perfect conditions, makes the caisson monolithic, without concrete joints. This makes it a structure that is highly resistant to the pounding of water and accidental impacts.
3. The manufacture of caisson plant structures is a highly tested technology with well-proven logistics. It is possible to manufacture 20,000 t parts in just 10 days. All this implies high quality implementation in record time.
4. Due to the easy construction, low cost and large dimensions and generated weight thereof, this construction system allows platforms to be built which support the largest wind turbines (10 MW, 12 MW or higher) that are currently being designed.
5. The superstructure (generally a wind tower) is not joined to the platform via a plate with bolts that supports all the torsion in that area, but rather it distributes it via a simple joining throughout the structure avoiding the concentration of stresses.
6. The external spans of the structure are of the order of four metres, with wall thicknesses of 50 cm, such the bending that can occur on the same is very small.
7. The force exerted by the mooring lines on the structure is directly absorbed and distributed by three large radial facings that stiffen the structure, without therefore affecting stresses on other facings. All this leads to a low reinforcement and minimisation of stresses.
8. Maintenance is almost zero due to low stresses and concentrations in a concrete that is hardly reinforced. Cracking is very low because, due to the structural type thereof, the concrete is mostly compressed, even where it is strained in other solutions. The useful life of the generated structure can exceed 50 years and could allow the wind turbine to be replaced after 20-25 years for another, more powerful one.
9. The structure is completely constructed and assembled in port, including the superstructure (usually a wind turbine), and it is moved by floating by means of conventional tugboats to the working position thereof. The low draught thereof allows it to be carried out in practically any conventional port close to implementation.
10. The anchoring process of the structure is carried out by exclusively ballasting the cells thereof with seawater, without the need for any additional means, or auxiliary vessels.
11. Due to the very large restoring torque thereof and therefore minimum operating inclination, the energy production of the turbine is guaranteed at full capacity at all times without reductions to carry out ballast transfer when the wind changes (as occurs with almost all other existing solutions).
12. All the installations subject to routine maintenance are located on the deck of the platform (there are no submerged equipment or metal structures), meaning the tasks are considerably simplified.
13. Since it is only ballasted with water, it enables easy emptying for transfer back to port and for more complex maintenance (onshore). In addition, it has a "plug and play" system for moorings and electrical connection, such that this process can be carried out with great agility.
14. The construction system using a caisson plant is the most environmentally friendly system for the construction of wind and port infrastructures, with a very notable decrease in polluting substances compared to traditional techniques. It is a foundation system that does not make noise which affects marine mammals and it can be carried out on practically all types of seabed without altering them. It requires a lower consumption of raw material resources which, depending on the features of each body, can lead to savings of 50%.
15. The low reinforcement that is required with the proposed method and the rapid implementation thereof represent a cost reduction of more than 50% compared to other similar metal structure.
16. The construction system used produces the same savings even when few units are produced, unlike current solutions that only produce savings in large productions since they require significant infrastructure whose cost has to be distributed among them.

In this text, the word "comprises" and its variants (such as "comprising", etc.) should not be understood in an exclusive sense, i.e., they do not exclude the possibility of that which is described including other elements, steps, etc.

Moreover, the invention is not limited to the specific embodiments described herein, but rather encompasses, for example, the variations that a person skilled in the art could make, within the scope of what may be deduced from the claims.

The invention claimed is:

1. A structure (2) for supporting a wind turbine tower (1) provided with a housing (7) for fitting therein a foot of the wind turbine tower (1), a main axis (F) being defined on the structure (2) which coincides with the main axis of the wind turbine tower (1) when the wind turbine tower is fitted in the housing (7), characterised in that the structure (2) comprises a body with a constant cross-section along the direction of the main axis (F) in which the following are defined:
    an internal wall (8) that defines the housing (7) for fitting therein the foot of the wind turbine tower (1);
    an external wall (9) that defines an outer perimeter of the body;
    an intermediate wall (10) arranged between the internal wall (8) and the external wall (9);
    the internal wall (8) and the intermediate wall (10) being joined by internal radial ribs (11) perpendicular to the internal wall (8), a plane of the internal wall (8) passing through the main axis (F), such that at the intermediate wall (10) first joining nodes (12) are defined between the intermediate wall (10) and radial ribs (11);
    the intermediate wall (10) and the external wall (9) being joined by reticular ribs (14 and 15), the cross-section of the reticular ribs (14 and 15) according to a plane perpendicular to the main axis (F) is a reticular structure (13), such that first reticular ribs (14) extend from the first joining nodes (12) perpendicularly to the external wall (9), and second reticular ribs (15) extend obliquely with respect to the first reticular ribs (14) from first joining nodes (12) to the external wall (9), second joining nodes (16) being defined on the external wall (9) where the external wall (9) and pairs of second reticular ribs (15) converge;
    wherein the walls and ribs are made of concrete;
    the housing being a housing for fitting therein the foot of the tower by inserting grout between the foot of wind turbine the tower and the housing.
2. The structure according to claim 1, comprising n identical bodies (3), each body being delimited by:

at least two joining walls (19) made up of an internal radial rib and a first reticular rib, the joining walls (19) being intended to be attached to joining walls (19) of the adjoining bodies (3), said two radial walls forming an angle α=360/n; and a central wall (8bis), so that the central walls (8bis) make up the nth fraction of the internal wall (8);

an external wall (9bis)

joining means between adjoining bodies (3) bolts and grout.

3. The method for constructing a structure according to claim 2, by means of a floating dock, comprising the following steps:

constructing caissons on the floating dock;
preparing the structure for subsequent assembly thereof;
creating of recesses for indicating the positioning of perforations to be made for the insertion of pins;
inserting cables in sheaths that will be used to bring the caissons closer together;
arranging waterproof joints (23);
arrange gates (26) in gaps of a lower plate;
assembling a structure made up of three pieces, consisting of the following phases:
straightening of the caissons before joining the caissons, to keep them in a horizontal position;
approaching with tugboats to the joining position thereof;
final approaching and connection by means of cables previously inserted in sheaths of ends;
regularisation grouting (27) of chambers located between caissons;
drilling in cutouts that were arranged (22) and insertion of pins (28) in holes made;
concreting of a circular lower plate (29);
installation of internal pipes for filling and emptying cells (30);
positioning of pre-plates (31) in the upper portion of the caisson and placement of reserves for passage of air outlet pipes (32) and ballast water (33);
placement of anchors for mooring lines (34);
concreting of an upper plate (35).

4. The structure according to claim 1, wherein the reticular structure is of a Warren type with uprights.

5. The structure according to claim 1, wherein an angle between pairs of second reticular ribs (15) is 60°, so that a mesh of equilateral triangles (13 and 20) divided by the first reticular ribs (14) is configured.

6. The structure according to claim 1 having sides, wherein a distance (A) between each pair of second nodes (16) is comprised between 6 and 14 metres, and wherein the sides of the structure (2) measure from 1 to 10 times said distance (A).

7. The structure according to claim 1, wherein the following are defined:

internal cells (17) which are those formed by at least one internal wall section, two radial ribs (11) and one intermediate wall section (10); and
peripheral cells (18) being other cells that are not internal.

8. The structure according to claim 7, wherein some peripheral cells are capable of rising above a deck of the base, forming towers (55).

9. The structure according to claim 7, wherein a set of internal cells (17) is provided with a hydraulic communication system therebetween, including devices for emptying and filling which allow a level to be regulated, both for the anchoring thereof and for refloating.

10. The structure according to claim 7, wherein some of the internal cells (17) comprise upper openings (51) and lower openings (52), so that these upper openings (51) and lower openings (52) form a pneumatic damping system that allows for the shifting of the level of the internal cells (17) with respect to sea level, by means of limiting an inlet and an outlet of air from the internal cells (17).

11. A method for constructing a structure according to claim 7 by means of a floating dock, comprising the following steps:

constructing a floating dock with sufficient dimensions to construct the platform;
placing a reinforcement of a lower plate and concreting on the base of the floating dock;
placing sliding formwork for the construction of vertical facings;
concreting of the vertical facings until the structure has sufficient buoyancy to have a safe freeboard to continue concreting outside the caisson plant;
ballasting of a caisson plant until the caisson is released and moored to the pier to continue concreting while floating;
once an entire strut of the structure has been concreted, removing the sliding formwork, pre-plates are placed, and an upper plate is concreted.

12. The structure according to claim 1, wherein each body is closed at a lower portion thereof by a lower plate (4) perpendicular to the main axis (F), the structure (2) comprising an upper plate (6) provided with an opening (50) for the foot of the tower (1), the upper plate covering at least one body (3).

13. The structure according to claim 12, wherein the lower plates (4) protrude laterally from the respective external walls (9), so that damping tabs (53) are configured.

14. The structure according to claim 12, wherein the plates are made of concrete.

15. The structure according to claim 1, wherein the housing (7) is cylindrical.

16. The structure according to claim 1, wherein the platform has a circular layout, with perimeter triangles similar to equilateral triangles, with the external and internal walls in the shape of an arc of a circle.

17. The structure according to claim 1, wherein three additional smaller circular cells are arranged, evenly distributed and located at uniform intervals with respect to an central circular cell and therebetween, to be able to house other supports of a superstructure.

18. A method for assembling a wind turbine shaft on a structure according to claim 1, comprising the following steps:

inserting a superstructure (36) into a central gap that has been formed;
grouting of a space that remains the shaft and the structure.

19. A method for commissioning a structure according to claim 1 comprising the following steps:

towing and positioning of the platform by means of three tugboats;
ballasting with water through installed pumps;
filling central cells until an internal water level is equal to sea level;
and:
opening lower gates, joining the central cells with the sea;
adjusting an upper air outlet required to achieve pneumatic damping adapted to the waves;
slightly filling external cells located at the vertices of the base (44) for the operation of a variable ballast system that is carried out by pipes (41);

connecting of previously pre-installed mooring lines;
establishing an electric connection.

20. A method for uninstalling a structure according to claim 1 comprising the following steps:
fixing of the platform by means of three tugboats;
electrical disconnection and fixation for subsequent use;
disconnection of mooring lines and fixation for subsequent use;
closing of gaps in a lower plate;
emptying of ballast water from cells by means of installed pumps, or by means of injection of compressed air, which causes the structure to refloat;
towing of the structure to port.

* * * * *